United States Patent
Wang et al.

(10) Patent No.: US 7,493,225 B2
(45) Date of Patent: Feb. 17, 2009

(54) METHOD FOR CALIBRATING MASS SPECTROMETRY (MS) AND OTHER INSTRUMENT SYSTEMS AND FOR PROCESSING MS AND OTHER DATA

(75) Inventors: Yongdong Wang, Wilton, CT (US); Ming Gu, Yardley, PA (US)

(73) Assignee: Cerno Bioscience LLC, Danbury, CT (US)

( * ) Notice: Subject to any disclaimer, the term of this patent is extended or adjusted under 35 U.S.C. 154(b) by 0 days.

(21) Appl. No.: 10/576,564

(22) PCT Filed: Oct. 20, 2004

(86) PCT No.: PCT/US2004/034618

§ 371 (c)(1),
(2), (4) Date: Apr. 18, 2006

(87) PCT Pub. No.: WO2005/040985

PCT Pub. Date: May 6, 2005

(65) Prior Publication Data

US 2007/0136017 A1    Jun. 14, 2007

Related U.S. Application Data

(63) Continuation-in-part of application No. 10/689,313, filed on Oct. 20, 2003, now Pat. No. 6,983,213.

(51) Int. Cl.
*G01R 35/00* (2006.01)

(52) U.S. Cl. .................. 702/85; 250/282; 250/287; 436/58; 702/23; 702/27; 702/104; 702/109; 702/189

(58) Field of Classification Search ............... 702/19, 702/22, 23, 27, 85, 104, 109, 180, 189; 435/4, 435/6, 7.1, 7.92, 69.1, 287.2; 436/518; 250/282, 250/288; 324/304, 309
See application file for complete search history.

(56) References Cited

U.S. PATENT DOCUMENTS 5,206,174 A    4/1993    Gehrke et al.
(Continued)

OTHER PUBLICATIONS

S. Tominaga, Analysis of experimental curves using singular value decomposition, IEEE Transactions on Acoustics, Speech and Signal Processing, vol. 29, No. 3, Jun. 1981, pp. 429-433.

(Continued)

*Primary Examiner*—John H Le
(74) *Attorney, Agent, or Firm*—David Aker

(57) ABSTRACT

A method for obtaining at least one calibration filter for a Mass Spectrometry (MS) instrument system. Measured isotope peak cluster data in a mass spectral range is obtained for a given calibration standard. Relative isotope abundances and actual mass locations of isotopes corresponding thereto are calculated for the given calibration standard. Mass spectral target peak shape functions centered within respective mass spectral ranges are specified. Convolution operations are performed between the calculated relative isotope abundances and the mass spectral target peak shape functions to form calculated isotope peak cluster data. A deconvolution operation is performed between the measured isotope peak cluster data and the calculated isotope peak cluster data after the convolution operations to obtain the at least one calibration filter. Provisions are made for normalizing peak widths, combining internal and external calibration, and using selected measured peaks as standards. Aspects of the methods are applied to other analytical instruments.

34 Claims, 22 Drawing Sheets

U.S. PATENT DOCUMENTS

| | | | |
|---|---|---|---|
| 5,247,175 | A | 9/1993 | Schoen et al. |
| 5,303,165 | A | 4/1994 | Ganz et al. |
| 5,459,677 | A | 10/1995 | Kowalski et al. |
| 5,545,895 | A | 8/1996 | Wright et al. |
| 6,015,667 | A | 1/2000 | Sharaf |
| 6,049,762 | A | 4/2000 | Ganz et al. |
| 6,138,082 | A * | 10/2000 | Wang et al. .................. 702/109 |
| 6,188,064 | B1 | 2/2001 | Koester |
| 6,373,052 | B1 | 4/2002 | Hoyes et al. |
| 6,519,543 | B1 | 2/2003 | Giannuzzi et al. |
| 6,586,728 | B1 | 7/2003 | Gavin et al. |
| 6,629,040 | B1 | 9/2003 | Goodlett et al. |
| 6,745,133 | B2 * | 6/2004 | Axelsson ..................... 702/27 |
| 6,787,761 | B2 * | 9/2004 | Hastings ..................... 250/282 |
| 2002/0059047 | A1 | 5/2002 | Haaland |
| 2003/0218129 | A1 | 11/2003 | Rather |
| 2004/0024552 | A1 | 2/2004 | Bowdler |

OTHER PUBLICATIONS

D. L. Smith et al., Probing the Non-covalent Structure of Proteins by Amide Hydrogen Exchange and Mass Spectrometry, J. Mass Spectrometry, V32, p. 135-46, 1997.

J. Kast et al, Noise Filtering Techniques for Electrospray Quadrupole Time of Flight Mass Spectra, J. Am. Soc. Mass Spectrom., V14, p. 766-776, Jul. 2003.

J. A. Szymura et al., Band Composition Analysis: A New Procedure for Deconvolutionof the Mass Specrta of Organometallic Compounds, J. Mass Spectrom., V. 38, p. 817-822, Jul. 2003.

W.R Cannon et al., Improved Peptide Sequencing Using Isotope Information Inherent in Tandem Mass Spectra, Rapid. Commun. Mass Spectrom.,17,1793-1801,2003.

J.Fernandez-de-Cossio et al,Automated Interpretation of Mass Spectra of Complex Mixtures by Matching of Isotope . . . , Rapid.Commun.MassSpectrom., V18,p. 2465-247,2004.

A.L. Rockwood, S.L. Van Orden, R.D. Smith, Rapid Calculation of Isotope Distributions, Analytical Chemistry, Aug. 1, 1995, pp. 2699-2703, vol. 67, No. 15.

James A. Yergey, A General Approach to Calculating Isotope Distributions for Mass Spectrometry, International Journal of Mass Spectrometry and Ion Physics. Mar. 1983, pp. 337-349, vol. 52, Elsevier Science Publishers. Amsterdam, Netherlands.

Y. Wang, D.J, Veltkamp, B.R. Kowalski, Multivariate Instrument Standardization, Analytical Chemistry, Dec. 1, 1991, pp. 2750-2756, vol. 63, No. 23.

B.R. Kowalski, M. B. Seasholtz, Recent Developments In Multivariate Calibration, Journal of Chemomoules, Jun. 1, 1990, pp. 129-145, vol. 5, John Wiley & Sons, Ltd.

J. Neter, W. Wasserman, M. H. Kutner, Applied Linear Regression Models, 2d, 1989, Ch. 11, pp. 418-420, Irwin, Homewood, IL, Boston, MA.

J. Neter, W. Wasserman, M. H. Kutner, Applied Linear Regression Models, 2d, 1989, Ch. 8, pp. 295-305, Irwin, Homewood, IL, Boston, MA.

Witjus et al., Automatic correction of peak shifts in Raman spectra before PLS regression, Chemometrics and Intelligent Laboratory Systems vol. 52, No. 1, p. 105-116, Aug. 14, 2000.

Harald Martins, Tormod Naes: "Multivariate Calibration", Chap 7. Pretreatment and Linearization, John Wiley & Sons, 1989 (XP-002444794).

Schierle et al,Qualitative and Quantitative Analysis in ICP-AES Using Multivariate Calibration, Mikrochim. Acta, vol. 113, No. 3, pp. 357-372, (1994).

Stein, An Integrated Methodfor Spectrum Extraction and Compound Identification from Gas Chromatography/Mass Spectrometry Data, J. Am Soc. Mass Spectrom, vol. 10, pp. 770-781, (Aug. 1, 1999).

Felinger, Data Analysis and Signal Processing in Chromatography, pp. 218-225, 306-300, XP-002439117, Elsivar (Jan. 1, 1998).

Tibshirani et al., Sample classification from protein mass spectrometry by peak probability contrasts, Bioinformatics, vol. 20, No. 7, p. 1-34 (Jun. 2004).

Carpenter et al., Statistical Processing and Analysis of Proteomic and Genomic Data, Proceedings of the Pharmaceutical SAS Users Group, pp. 545-548, XP-002494126 (May 4, 2003).

Yasui et al, A data-analytic strategy for protein biomarker discovery: profiling of high-dimensional proteomic data for cancer detection, Biostatics, vol. 4, No. 3 pp. 449-463 (Jul. 2003).

Gentzel et al., Preprocessing of tandom mass spectometric data to support automatic protein identification, Proteomics, vol. 3, pp. 1597-1610 (Aug. 2003).

Danielsson et al., Matched filtering with background suppression for improved quality of base peak chromatograms and mass spectra in liquid chromatography-mass spectrometry, Analytica Chimica Acta, vol. 454, No. 2, pp. 167-184 (2002).

Russell et al., High-resolution Mass Spectrometry and acurate Mass measurements with Emphasis on the Characterization of Peptides and Proteins by Matrix-assisted Laser Desorption/Ionization Time-of-flight Mass Spectrometry, Journal Of Mass Spectrometry, vol. 32, No. 3, pp. 263-276 (1997).

Gras et al., Improving protein identification from peptide mass fingerprinting through a parameterized multi-level scoring algorithm and an optomized peak detection, Electrophoresis, vol. 20, pp. 3535-3550 (Jan. 1, 1999).

Merchant et al., Recent advancements in surface-enhanced laser desorption/ionization-time of flight-mass spectrometry, Electrophoresis, vol. 21, pp. 1164-1177 (Jan. 1, 2000).

* cited by examiner

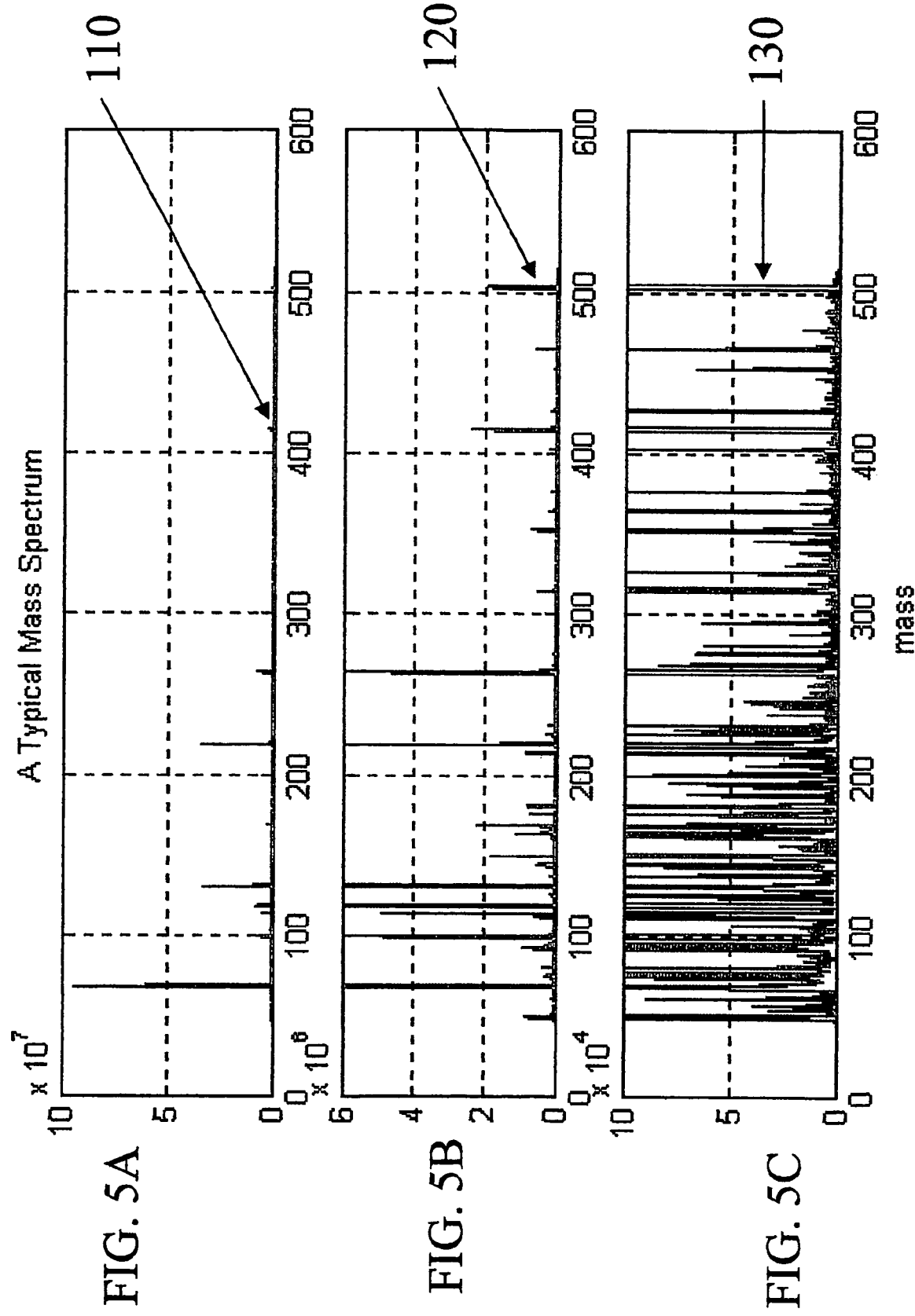

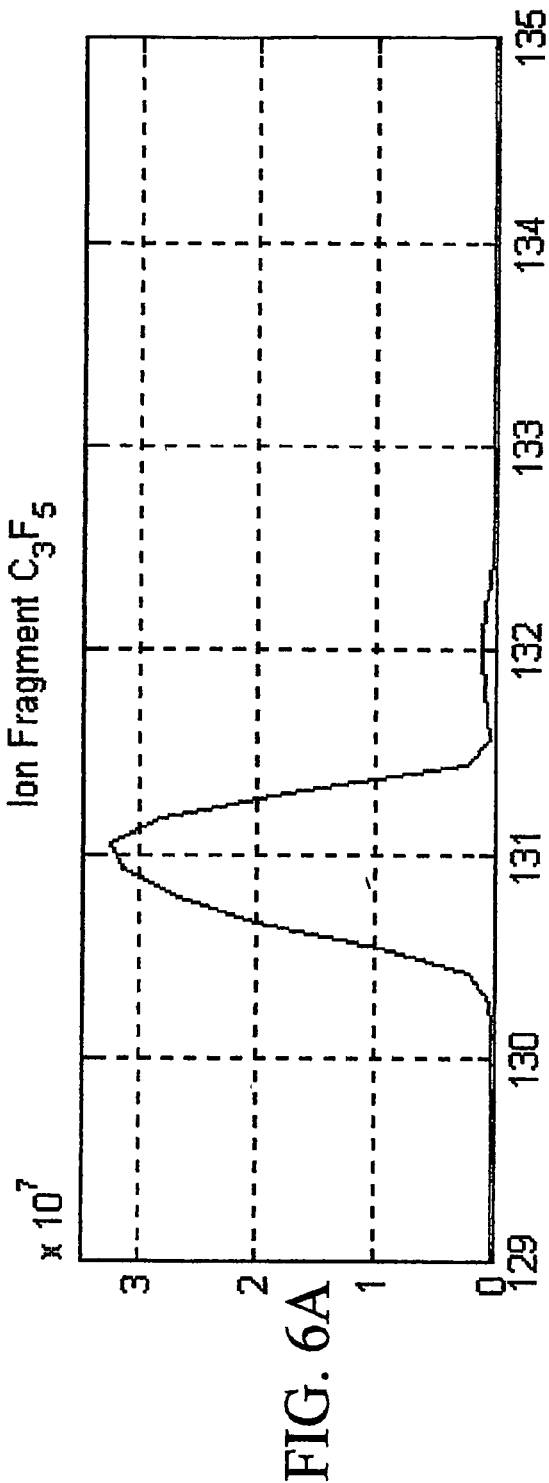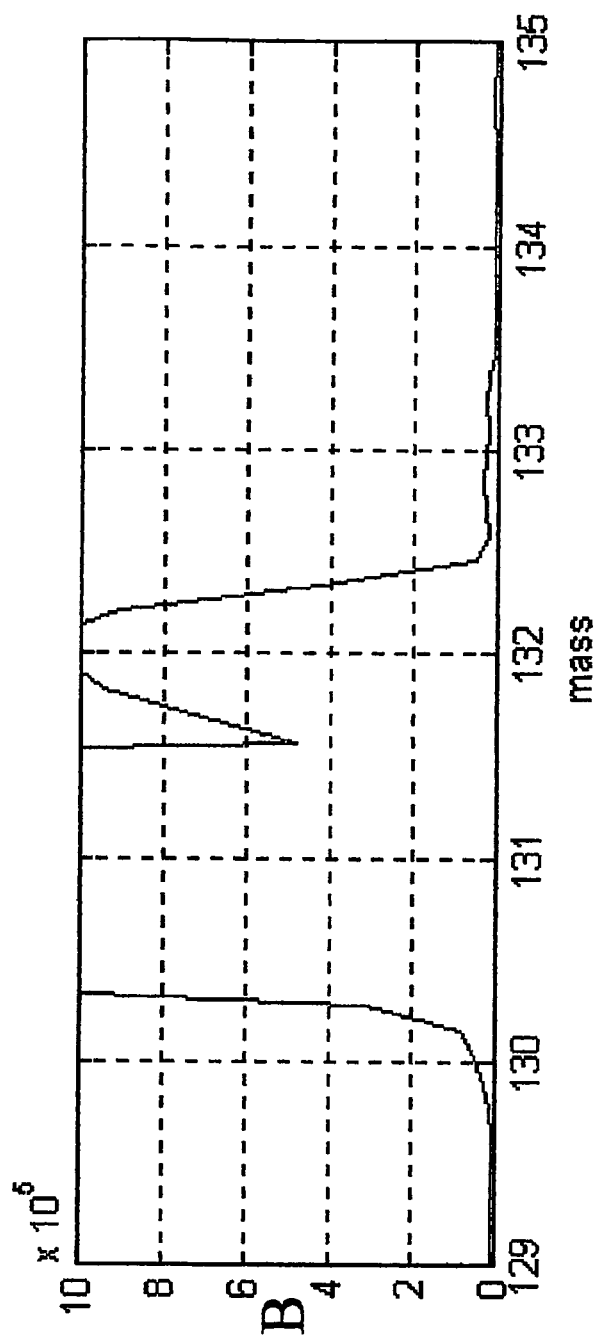
FIG. 6A
FIG. 6B

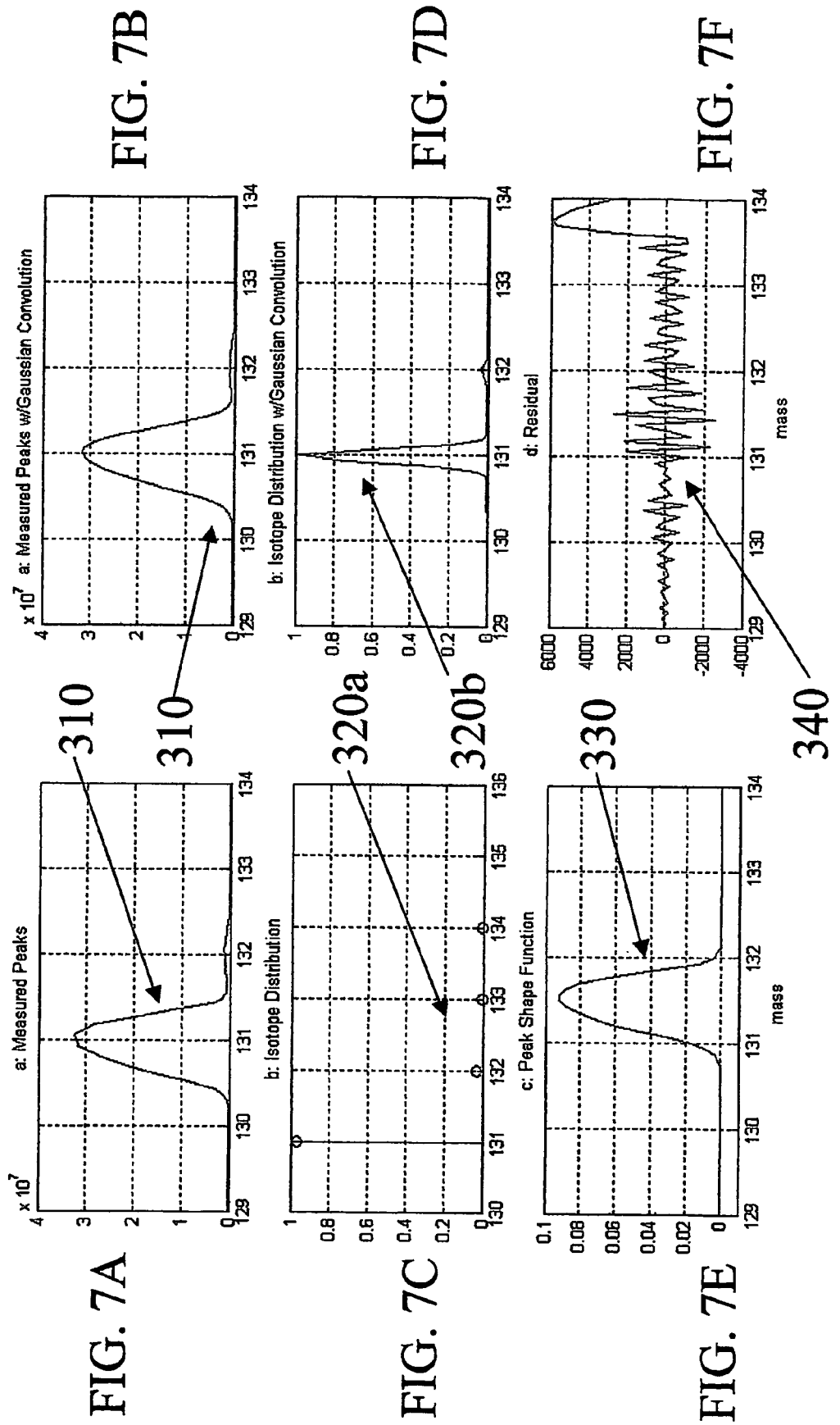

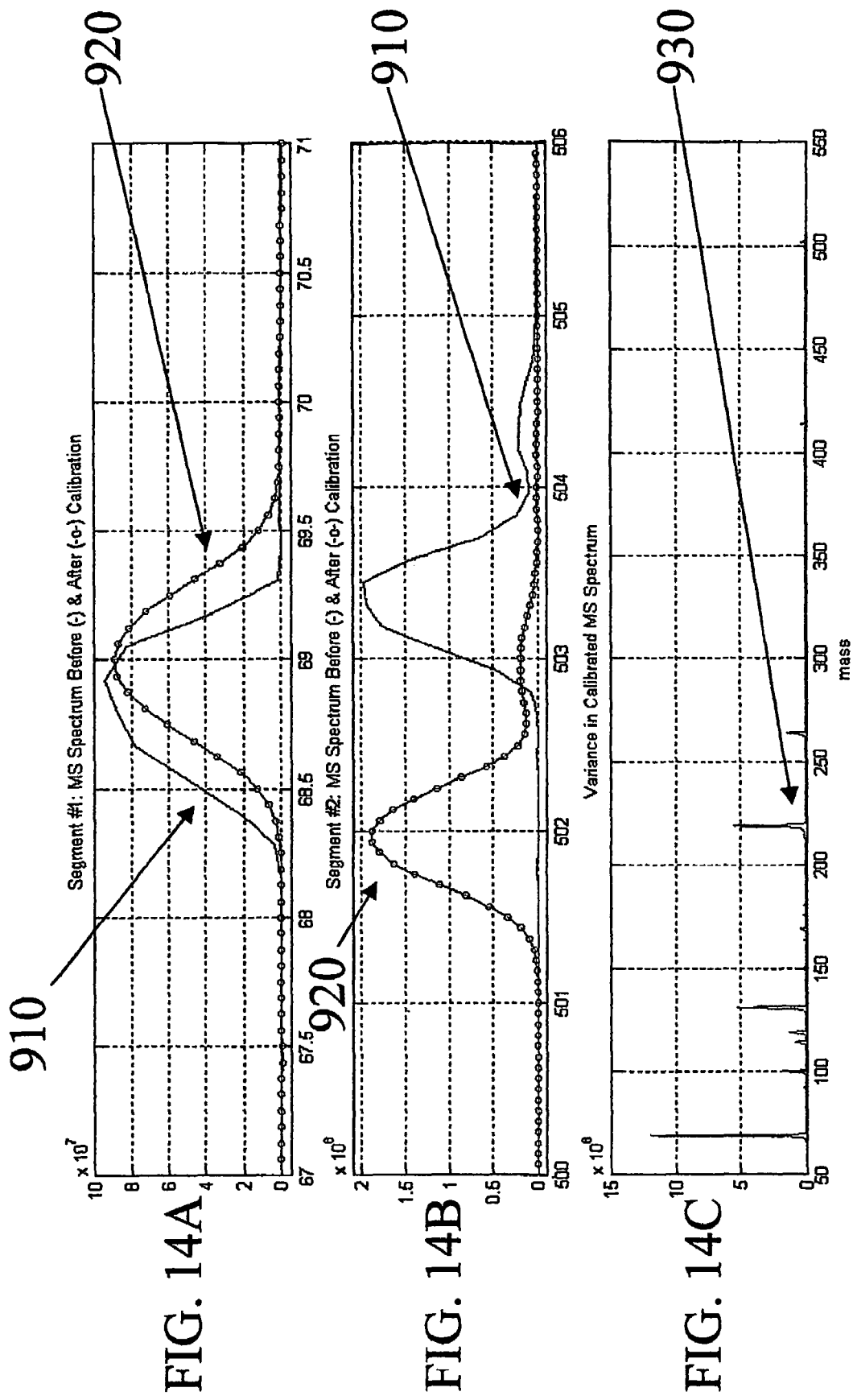

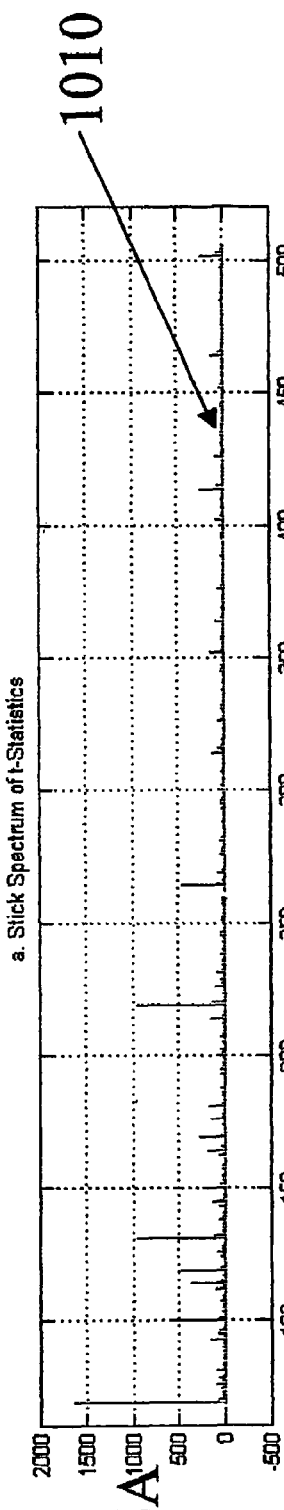
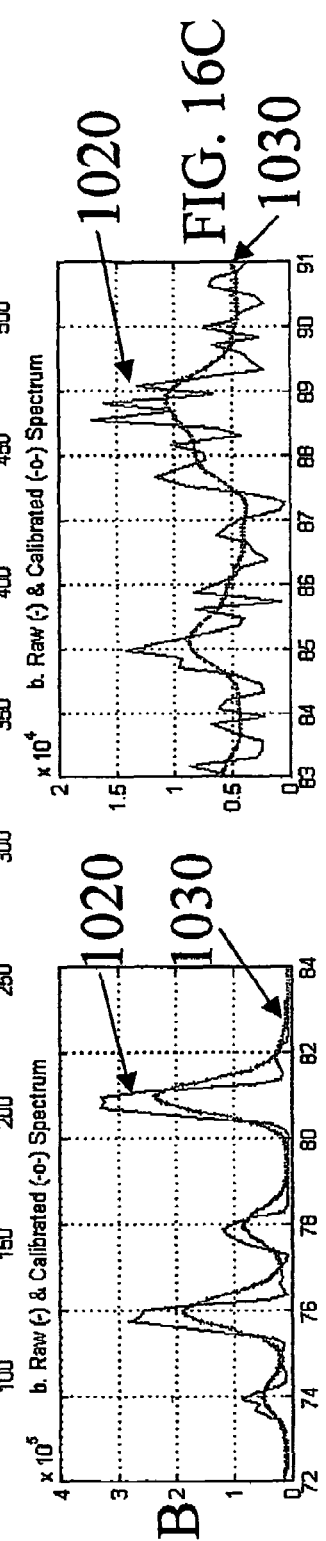
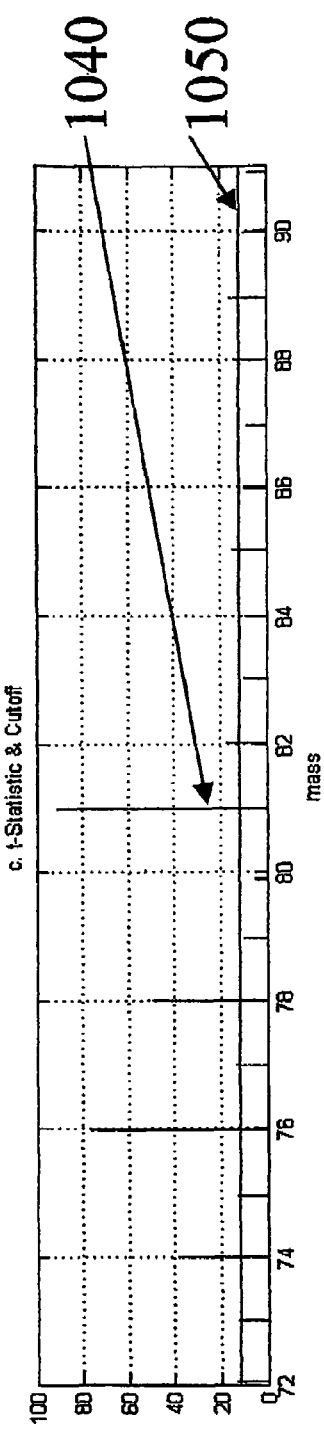
FIG. 16A
FIG. 16B
FIG. 16C
FIG. 16D

METHOD FOR CALIBRATING MASS SPECTROMETRY (MS) AND OTHER INSTRUMENT SYSTEMS AND FOR PROCESSING MS AND OTHER DATA

This application is a continuation-in-part, and claims priority from, U.S. patent application Ser. No. 10/689,313 filed on Oct. 20, 2003, and issued as U.S. Pat. No. 6,983,213, the entire contents of which is hereby incorporated by reference.

BACKGROUND OF THE INVENTION

1. Field of the Invention

The present invention generally relates to the field of analytical instruments and Mass Spectrometry (MS) and, more particularly, to methods for calibrating such instruments and MS instruments systems, and for processing corresponding data.

2. Background of the Invention

Mass Spectrometry (MS) is a 100-year old technology that relies on the ionization and fragmentation of molecules, the dispersion of the fragment ions by their masses, and the proper detection of the ion fragments on the appropriate detectors. There are many ways to achieve each of these three key MS processes which give rise to different types of MS instrumentations having distinct characteristics.

Four major types of ionization techniques are commonly used to both break apart a larger molecule into many smaller molecules and at the same time ionize them so that they can be properly charged before mass dispersion. These ionization schemes include Electrospray Ionization (ESI), Electron Impact Ionization (EI) through the impact of high-energy electrons, Chemical Ionization (CI) through the use of other reactive compounds, and Matrix-Assisted Laser Desorption and Ionization (MALDI). Both ESI and MALDI also serve as means for sample introduction.

Once the molecules in a sample get fragmented and charged through ionization, each fragment will have a corresponding mass-to-charge (m/z) ratio, which will become the basis to mass dispersion. Based on the physical principles used, there are many different ways to achieve mass dispersion, resulting in mass spectral data similar in nature but different in details. A few of the commonly seen configurations include: magnetic sectors; quadrupoles; Time-Of-Flight (TOF); and Fourier Transform Ion-Cyclotron Resonance (FT ICR).

The magnetic sectors configuration is the most straightforward mass dispersion technique where ions with different m/z ratios would separate in a magnetic field and exit this field at spatially separated locations where they will be detected with either a fixed array of detector elements or a movable set of small detectors that can be adjusted to detect different ions depending on the application. This is a simultaneous configuration where all ions from the sample are separated simultaneously in space rather than sequentially in time.

The quadrupoles configuration is perhaps the most popular MS configuration where ions of different m/z values will be filtered out of a set of (usually 4) parallel rods through the manipulation of RF/DC ratios applied to these rod pairs. Only ions of a certain m/z value will survive the trip through. these rods at a given RF/DC ratio, resulting in the sequential separation and detection of fragment ions. Due to its sequential nature, only one detector element is required for detection. Another configuration that uses ion traps can be considered a special example of quadrupole MS.

The Time-Of-Flight (TOF) configuration is another sequential dispersion and detection scheme that lets the fragment ions accelerate under electrical field and then drift through a high vacuum flight tube before detection. Ions of different m/z values would arrive at different times to the detector and the arrival time can be related to the m/z values through the use of calibration standard(s).

In Fourier Transform Ion-Cyclotron Resonance (FT ICR), after fragmentation and ionization, all ions can be introduced to an ion cyclotron where ions of different m/z ratios would be trapped and resonate at different frequencies. These ions can be pulsed out through the application of a Radio Frequency (RF) signal and the ion intensities measured as a function of time on a detector. Upon Fourier transformation of the time domain data measured, one gets back the frequency domain data where the frequency can be related back to m/z ratios through the use of calibration standard(s).

Ions can be detected either directly by the use of Faraday cups or indirectly by the use of electron multiplier tubes (EMT)/plates (EMP) or photon multiplier tubes (PMT) after a converter that converts ions into light. FIGS. 5A, 5B, and 5C are diagrams illustrating a typical mass spectral data trace on different ion intensity scales 110, 120, and 130 respectively plotted as a function of m/z ratio, according to the prior art.

The past one hundred years have witnessed tremendous strides made on the MS instrumentation with many different flavors of instruments designed and built for high throughput, high resolution, and high sensitivity work The instrumentation has been developed to a stage where single ion detection can be routinely accomplished on most commercial MS systems with unit mass resolution allowing for the observation of ion fragments coming from different isotopes. In stark contrast to the sophistication in hardware, very little has been done to systematically and effectively analyze the massive amount of MS data generated by modern MS instrumentation.

On a typical mass spectrometer, the user is usually required or supplied with a standard material having several fragment ions covering the mass spectral m/z range of interest. Subject to baseline effects, isotope interferences, mass resolution, and resolution dependence on mass, peak positions of a few ion fragments are determined either in terms of centroids or peak maxima through a low order polynomial fit at the peak top. These peak positions are then fit to the known peak positions for these ions through either $1^{st}$ or other higher order polynomials to calibrate the mass (m/z) axis.

After the mass axis calibration, a typical mass spectral data trace would then be subjected to peak analysis where peaks (ions) are identified. This peak detection routine is a highly empirical and compounded process where peak shoulders, noise in data trace, baselines due to chemical backgrounds or contamination, isotope peak interferences, etc., are considered.

For the peaks identified, a process called centroiding is typically applied where an attempt at calculating the integrated peak areas and peak positions would be made. Due to the many interfering factors outlined above and the intrinsic difficulties in determining peak areas in the presence of other peaks and/or baselines, this is a process plagued by many adjustable parameters that can make an isotope peak appear or disappear with no objective measures of the centroiding quality. A description will now be given of some of the many disadvantages of the conventional approaches to processing mass spectrometry data.

One disadvantage is the lack of mass accuracy. The mass calibration currently in use usually does not provide better than 0.1 amu (m/z unit) in mass determination accuracy on a conventional MS system with unit mass resolution (ability to visualize the presence or absence of a significant isotope peak). In order to achieve higher mass accuracy and reduce ambiguity in molecular fingerprinting such as peptide mapping for protein identification, one has to switch to an MS system with higher resolution such as quadrupole TOF (qTOF) or FT ICR MS which comes at a significantly higher cost.

Another disadvantage is the large peak integration error. Due to the contribution of mass spectral peak shape, its variability, the isotope peaks, the baseline and other background signals, and the random noise, current peak area integration has large errors (both systematic and random errors) for either strong or weak mass spectral peaks.

Yet another disadvantage includes difficulties with isotope peaks. Current approaches do not have a good way to separate the contributions from various isotopes which usually give out partially overlapped mass spectral peaks on conventional MS systems with unit mass resolution The empirical approaches used either ignore the contributions from neighboring isotope peaks or over-estimate them, resulting in errors for dominating isotope peaks and large biases for weak isotope peaks or even complete ignorance of the weaker peaks. When ions of multiple charges are concerned, the situation becomes even worse, due to the now reduced separation in m/z mass unit between neighboring isotope peaks.

Yet still another disadvantage is nonlinear operation. The current approaches use a multi-stage disjointed process with many empirically adjustable parameters during each stage. Systematic errors (biases) are generated at each stage and propagated down to the Later stages in an uncontrolled, unpredictable, and nonlinear manner, making it impossible for the algorithms to report meaningful statistics as measures of data processing quality and reliability.

A further disadvantage is the dominating systematic errors. In most of MS applications, ranging from industrial process control and environmental monitoring to protein identification or biomarker discovery, instrument sensitivity or detection limit has always been a focus and great efforts have been made in many instrument systems to minimize measurement error or noise contribution in the signal. Unfortunately, the peak processing approaches currently in use often create a source of systematic error even larger than the random noise in the raw data, thus becoming the limiting factor in instrument sensitivity.

An additional disadvantage is mathematical and statistical inconsistency. The many empirical approaches currently used make the whole mass spectral peak processing inconsistent either mathematically or statistically. The peak processing results can change dramatically on slightly different data without any random noise or on the same synthetic data with slightly different noise. In order words, the results of the peak processing are not robust and can be unstable depending on the particular experiment or data collection.

Moreover, another disadvantage is the instrument-to-instrument variations. It has usually been difficult to directly compare raw mass spectral data from different MS instruments due to variations in the mechanical, electromagnetic, or environmental tolerances. With the current ad hoc peak processing applied on the raw data, it only adds to the difficulty of quantitatively comparing results from different MS instruments or the same instrument at different measurement times. On the other hand, the need for comparing either continuum mass spectral data directly or peak processing results from an instrument at different times, different instruments, or different types of instruments has been increasingly heightened for the purpose of impurity detection or protein identification through computer searches in established MS libraries. An even greater need exists for biomarker discovery in proteomics, metabonomics, or lipidomics where mass spectral data are compared to each other from a diverse group of samples for differential analysis.

Accordingly, it would be desirable and highly advantageous to have methods for calibrating Mass Spectrometry (MS) instruments systems and for processing MS data that overcome the above-described deficiencies and disadvantages of the prior art.

SUMMARY OF THE INVENTON

The problems stated above, as well as other related problems of the prior art are solved by the present invention, methods for calibrating Mass Spectrometry (MS) and other instruments systems and for processing MS and other data.

According to an aspect of the present invention, there is provided a method for obtaining at least one calibration filter for a Mass Spectrometry (MS) instrument system. Measured isotope peak cluster data in a mass spectral range is obtained for a given calibration standard. Relative isotope abundances and actual mass locations of isotopes corresponding thereto are calculated for the given calibration standard. Mass spectral target peak shape functions centered within respective mass spectral ranges are specified. Convolution operations are performed between the calculated relative isotope abundances and the mass spectral target peak shape functions to form calculated isotope peak cluster data. A deconvolution operation is performed between the measured isotope peak cluster data and the calculated isotope peak cluster data after the convolution operations to obtain the at least one calibration filter.

According to another aspect of the present invention, there is provided a method of processing raw mass spectral data. A total filtering matrix is applied to the raw mass spectral data to obtain calibrated mass spectral data. The total filtering matrix is formed by measured isotope peak cluster data, obtained for a given calibration standard in a mass spectral range. The total filtering matrix is further formed by relative isotope abundances and actual mass locations of isotopes corresponding thereto, calculated for a same calibration standard. The total filtering matrix is further formed by specified mass spectral target peak shape functions centered within the mass spectral range. The total filtering matrix is further formed by convolution operations performed between the calculated relative isotope abundances and the mass spectral target peak shape functions to form calculated isotope peak cluster data. The total filtering matrix is further formed by a deconvolution operation performed between the measured isotope peak cluster data and calculated isotope peak cluster data after the convolution operations to obtain at least one calibration filter for the total filtering matrix.

According to yet another aspect of the present invention, there is provided a method for analyzing mass spectral peaks corresponding to mass spectral data obtained from a Mass Spectrometry (MS) instrument system. A weighted regression operation is applied to mass spectral peaks within a mass spectral range. Regression coefficients are reported as one of integrated peak areas and mass deviations corresponding to one of nominal masses and estimated actual masses.

According to still yet another aspect of the present invention, there is provided a method for calculating calibration filters for a Mass Spectrometry (MS) instrument system. At least one mass spectral peak shape function is obtained from a given calibration standard. Mass spectral target peak shape functions centered at mid points within respective mass spectral ranges are specified. A deconvolution operation is performed between the obtained at least one mass spectral peak shape function and the mass spectral target peak shape functions. At least one calibration filter is calculated from a result of the deconvolution operation.

According to a further aspect of the present invention, there is provided a method of processing raw mass spectral data. A total filtering matrix is applied to the raw mass spectral data to obtain calibrated mass spectral data The total filtering matrix is formed by obtaining, from a given calibration standard, at least one mass spectral peak shape function. The total filtering matrix is further formed by specifying mass spectral target peak shape functions centered at mid points within respective mass spectral ranges. The total filtering matrix is further formed by performing a deconvolution operation between the obtained at least one mass spectral peak shape function and the mass spectral target peak shape functions. The total filtering matrix is further formed by calculating at least one calibration filter from a result of the deconvolution operation.

According to a further aspect of the present invention, there is provided a method of updating the total filtering matrix. A total filtering matrix is applied to the raw mass spectral data containing at least one internal standard to obtain calibrated mass spectral date A new total filtering matrix is formed by applying the aforementioned calibration procedure using the calibrated mass spectral data as input and the at least one internal standard contained thereof as the standard. An updated total filtering matrix is formed by multiplying the two total filtering matrices or convoluting the two filters and applied to this and other raw mass spectral data to obtain externally and internally calibrated mass spectral data.

The method may further comprise introducing the internal calibration standard to be measured along with the sample, using one of online and offline mixing prior to detection. The internal calibration standard may be a preexisting component of the sample. The internal calibration procedure may comprises perform the steps of the methods set forth above.

The invention is also directed to a method for normalizing peak width in a data trace containing peaks within a range of positions, by measuring peak width as a function of peak position to obtain measurements of peak width, subjecting the measurements to a least squares fit to determine a function; and integrating the mathematical inverse of the function over the range to obtain a transform function usable to normalize the peak widths. The measuring of peak width is based on measurements taken with respect to a known standard. The function is used to normalize peak width. The inverse of the function may be a reciprocal of the function. Constants that are defined when integrating are dropped when obtaining the transform function. If the spectrum is that from a liquid chromatograph quadrupole time-of-flight mass spectrometer, the function may contain at least one logarithmic operation If the spectrum is that from a Fourier transform mass spectrometer, the function may be a logarithmic function. If the spectral is that from a time-of-flight mass spectrometer, the function may be a square root function. If the spectrum is that from a gas chromatograph mass spectrometer, the function may contain a logarithmic function. If the spectrum is that from a matrix-assisted laser desorption and ionization time-of-flight mass spectrometer, the function may be a reciprocal function.

In accordance with yet another aspect, the invention is directed to a method for calibrating data from samples containing a multiplicity of components, without adding an internal standard to the sample, by selecting at least one peak in the data to act as a standard, deriving a calibration filter based on the at least one selected peak; and using the calibration filter to analyze other peaks in the data, so as to produce calibrated data. The selecting comprises may comprise selecting more than one peak, and the deriving may comprise deriving a calibration filter for each selected peak, and interpolating to produce one of at least one of additional calibration filters and peaks for analyzing at positions between selected peaks. At least one selected peak may be convoluted, with a known function of a width insignificant compared to the original peak, while producing a calibration filter. The calibrated data may be subjected to statistical analysis to at least one of quantify, identify, and classify test samples. Various ones of the methods set forth above may be used in conjunction with this aspect of the invention.

The invention is also directed to analytical instrument system for practicing certain aspects of the methods set forth above, and in particular, to a multiplicity of various kinds of mass spectrometers of all types, configured so as to utilize at least one of the methods set forth herein.

In accordance with yet another aspect of the invention, a data storage medium may contain thereon computer readable instructions for causing a computer associated with an analytical instrument system to perform certain aspects of the methods set forth above, and in particular, to cause one or more of a multiplicity of various kinds of mass spectrometers of all types, to perform at least one of the methods set forth herein.

These and other aspects, features and advantages of the present invention will become apparent from the following detailed description of preferred embodiments, which is to be read in connection with the accompanying drawings.

BRIEF DESCRIPTION OF THE DRAWINGS

FIGS. 5A, 5B, and 5C are diagrams illustrating a typical mass spectral data trace on different ion intensity scales 110, 120, and 130 respectively plotted as a function of m/z ratio, according to the prior art;

FIGS. 6A and 6B are diagrams illustrating mass spectral a data for the ion fragment $C_3F_5$ on two different intensity scales;

FIGS. 7A and 7B are diagrams respectively illustrating the measured isotope cluster 310 before and after pre-convolution, according to an illustrative embodiment of the present invention;

FIGS. 7C and 7D are diagrams respectively illustrating the calculated isotope cluster 320 before and after pre-convolution, according to an illustrative embodiment of the present invention, FIGS. 7E and 7F are diagrams respectively illustrating the derived peak shape function 330 thus calculated and the corresponding deconvolution residual 340, according to an illustrative embodiment of the present invention;

FIGS. 14A, 14B, and 14C are diagrams illustrating a first segment 910 and a second segment 920 of a Mass Spectrometry (MS) spectrum before and after full calibration (both FIGS. 14A and 14B) and the variance spectrum 930 (FIG. 14C), according to an illustrative embodiment of the present invention;

FIG. 16A is a diagram illustrating a stick spectrum 1010 reflecting the t-statistic as a function of the exact mass locations (Equation 10) for possible mass spectral peaks across the mass range (raw mass spectrum taken from FIG. 5), according to an illustrative embodiment of the present invention;

FIGS. 16B and 16C are diagrams illustrating the overlay 1020 of the raw MS spectral segment and its fully calibrated version 1030, according to an illustrative embodiment of the present invention;

FIG. 16D is a diagram illustrating the corresponding t-statistic 1040 and a horizontal cutoff line 1050 with critical t values set at 12, according to an illustrative embodiment of the present invention;

DETAILED DESCRIMION OF THIE BEENTION

The present invention is directed principally to methods for calibrating Mass Spectrometry (MS) instruments systems and for processing MS data. As noted below, certain aspect of the invention may be very useful in the calibration of other types of instruments.

It is to be understood that the present invention may be implemented in various forms of hardware, software, firmware, special purpose processors, or a combination thereof Preferably, the present invention is implemented as a combination of hardware and software. Moreover, the software is preferably implemented as an application program tangibly embodied on a program storage device. The application program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform also includes an operating system and microinstruction code. The various processes and functions described herein may either be part of the microinstruction code or part of the application program (or a combination thereof) that is executed via the operating system. In addition, various other peripheral devices may be connected to the computer platform such as an additional data storage device and a printing device.

It is to be further understood that, because some of the constituent system components and method steps depicted in the accompanying Figures are preferably implemented in software, the actual connections between the system components (or the process steps) may differ depending upon the manner in which the present invention is programmed. Given the teachings herein, one of ordinary skill in the related art will be able to contemplate these and similar implementations or configurations of the present invention.

Typical systems in which the present invention may be used will now be described with reference to FIG. 1, FIG. 2 and FIG. 3.

Figure 1:
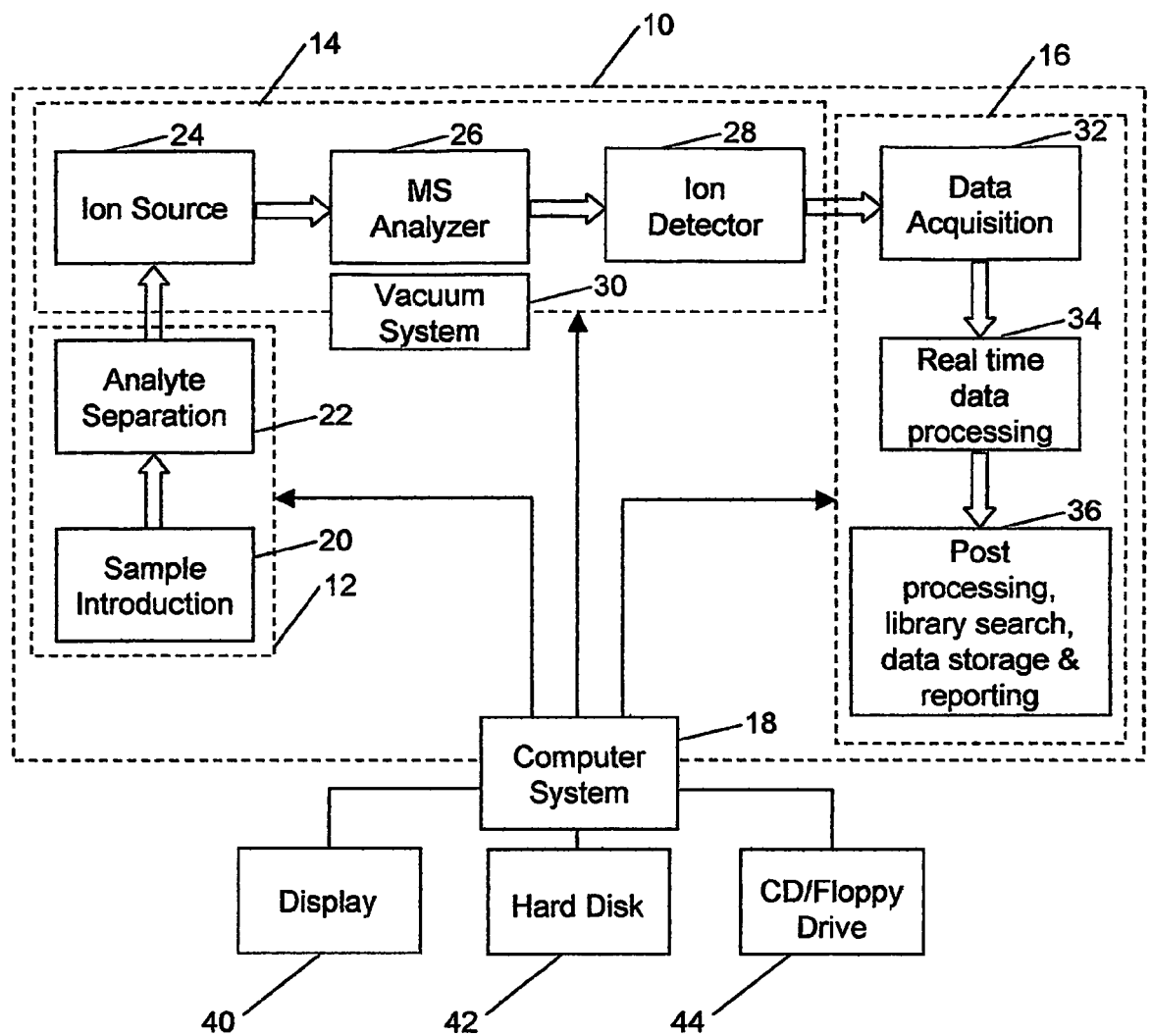
FIG. 1 is a block diagram of an analysis system in accordance with the invention, including a mass spectrometer.

Referring to FIG. 1, there is shown a block diagram of an analysis system 10, that may be used to analyze proteins or other molecules, as noted above, incorporating features of the present invention. Although the present invention will be described with reference to the single embodiment shown in the drawings, it should be understood that the present invention can be embodied in many alternate forms of embodiments. In addition, any suitable types of components could be used. Analysis system 10 has a sample preparation portion 12, a mass spectrometer portion 14, a data analysis system 16, and a computer system 18. The sample preparation portion 12 may include a sample introduction unit 20, of the type that induces a sample containing molecules of interest to system 10, such as Finnegan LCQ Deca XP Max, manufactured by Thermo Electron Corporation of Waltham, Mass., USA The sample preparation portion 12 may also include an analyte separation unit 22, which is used to perform a preliminary separation of analytes, such as the proteins to be analyzed by system 10. Analyte separation unit 22 may be any one of a chromatography column for either liquid or gas chromatography separation, a gel separation unit, such as is manufactured by Bio-Rad Laboratories, Inc. of Hercules, Calif., and is well known in the art. In general, a voltage or PH gradient is applied to the gel to cause the molecules such as proteins to be separated as a function of one variable, such as migration speed through a capillary tube (molecular weight, MW) and isoelectric focusing point (Hannesh, S. M, *Electrophoresis* 21, 1202-1209 (2000)) for one dimensional separation or by more than one of these variables such as by isoelectric focusing and by MW (two dimensional separation). An example of the latter is known as SDS-PAGE.

The mass separation portion 14 may be a conventional mass spectrometer and may be any one available, but is preferably one of MALDI-TOF, quadrupole MS, ion trap MS, or FRICR-MS, or some combinations such as a qTOF or triple-stage quadrupole (TSQ). If it has a MALDI or electrospray ionization ion source, such ion source may also provide for sample input to the mass spectrometer portion 14. In general, mass spectrometer portion 14 may include an ion source 24, a mass spectrum analyzer 26 for separating ions generated by ion source 24 by mass to charge ratio (or simply called mass), an ion detector portion 28 for detecting the ions from mass spectrum analyzer 26, and a vacuum system 30 for maintaining a sufficient vacuum for mass spectrometer portion 14 to operate efficiently. If mass spectrometer portion 14 is an ion mobility spectrometer, generally no vacuum system is needed.

The data analysis system 16 includes a data acquisition portion 32, which may include one or a series of analog to digital converters (not shown) for converting signals from ion detector portion 28 into digital data. This digital data is provided to a real time data processing portion 34, which process the digital data through operations such as summing and/or averaging. A post processing portion 36 may be used to do additional processing of the data from real time data processing portion 34, including library searches, data storage and data reporting.

Computer system 18 provides control of sample preparation portion 12, mass spectrometer portion 14, and data analysis system 16, in the manner described below. Computer system 18 may have a conventional computer monitor 40 to allow for the entry of data on appropriate screen displays, and for the display of the results of the analyses performed. Computer system 18 may be based on any appropriate personal computer, operating for example with a Windows® or UNIX® operating system, or any other appropriate operating system. Computer system 18 will typically have a hard drive 42, on which the operating system and the program for performing the data analysis described below is stored. A drive 44 for accepting a CD or floppy disk is used to load the program in accordance with the invention on to computer system 18. The program for controlling sample preparation portion 12 and mass spectrometer portion 14 will typically be downloaded as firmware for these portions of system 10. Data analysis system 16 may be a program written to implement the processing steps discussed below, in any of several programming languages such as C++, JAVA or Visual Basic.

Figure 2:
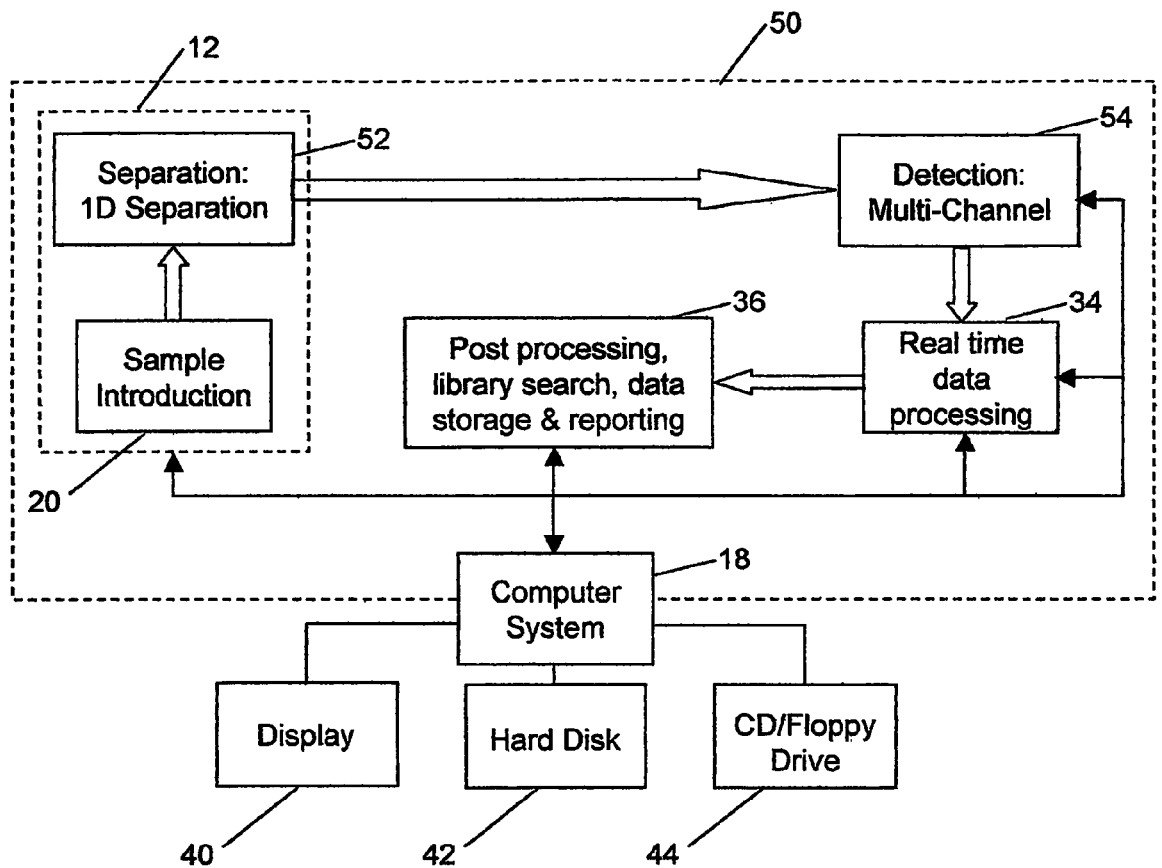
FIG. 2 is a block diagram of a system having one dimensional sample separation, and a multi-channel detector.

FIG. 2 is a block diagram of an analysis system 50 wherein the sample preparation portion 12 includes a sample introduction unit 20 and a one dimensional sample separation apparatus 52. By way of example, apparatus 52 may be a one dimensional electrophoresis apparatus. Separated sample components are analyzed by a multi-channel detection apparatus 54, such as, for example a series of ultraviolet sensors, or a mass spectrometer. The manner in which data analysis may be conducted is discussed below.

Figure 3:
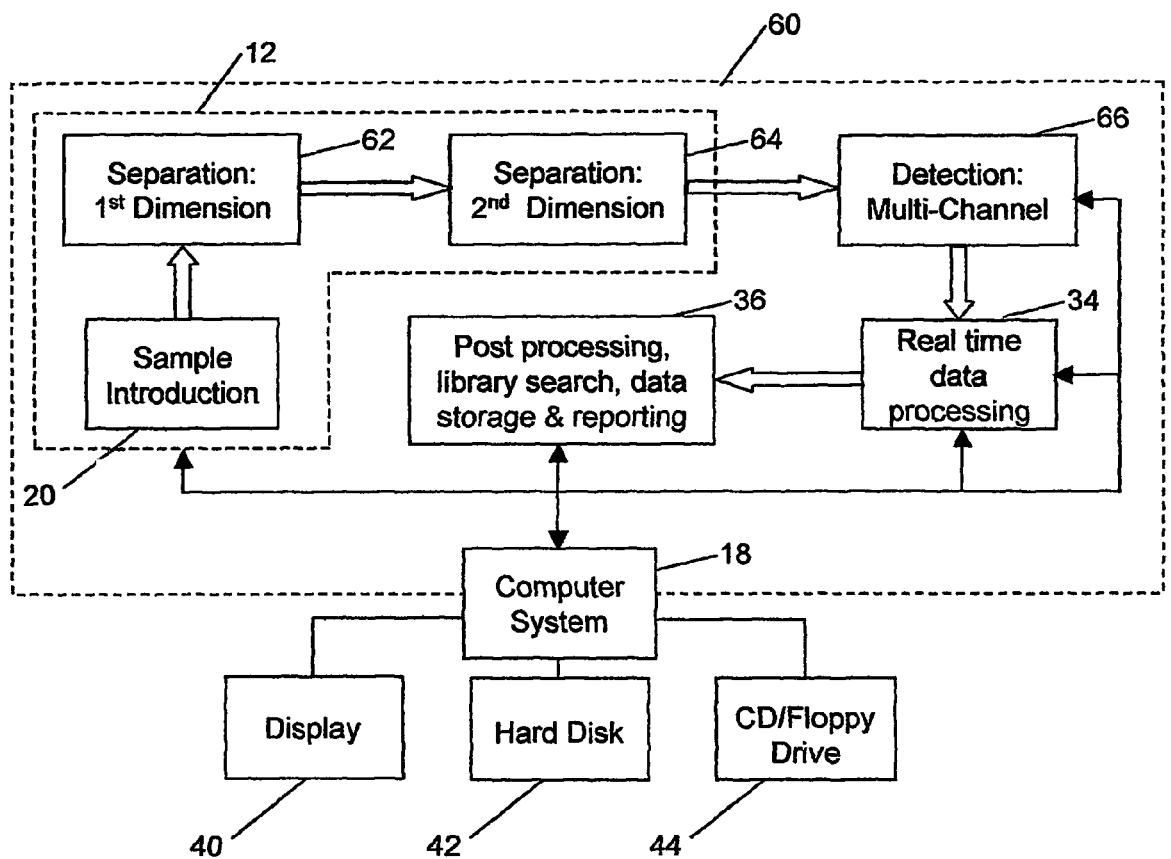
FIG. 3 is a block diagram of a system having two dimensional sample separation, and a single channel detector.

FIG. 3 is a block diagram of an analysis system 60, wherein the sample preparation portion 12 includes a sample introduction unit 20 and a first dimension sample separation apparatus 62 and a second dimension sample separation apparatus 64. By way of example, first dimension sample separation apparatus 62 and second dimension sample separation apparatus 64 may be two successive and different liquid chromatography units, or may be consolidated as a two-dimensional electrophoresis apparatus. Separated sample components are analyzed by a single channel detection apparatus 66, such as, for example an ultraviolet (UV) detector with a 245 nm bandpass filter, or a gray scale gel imager. Again, the manner in which data analysis may be conducted is discussed below.

Figure 4:
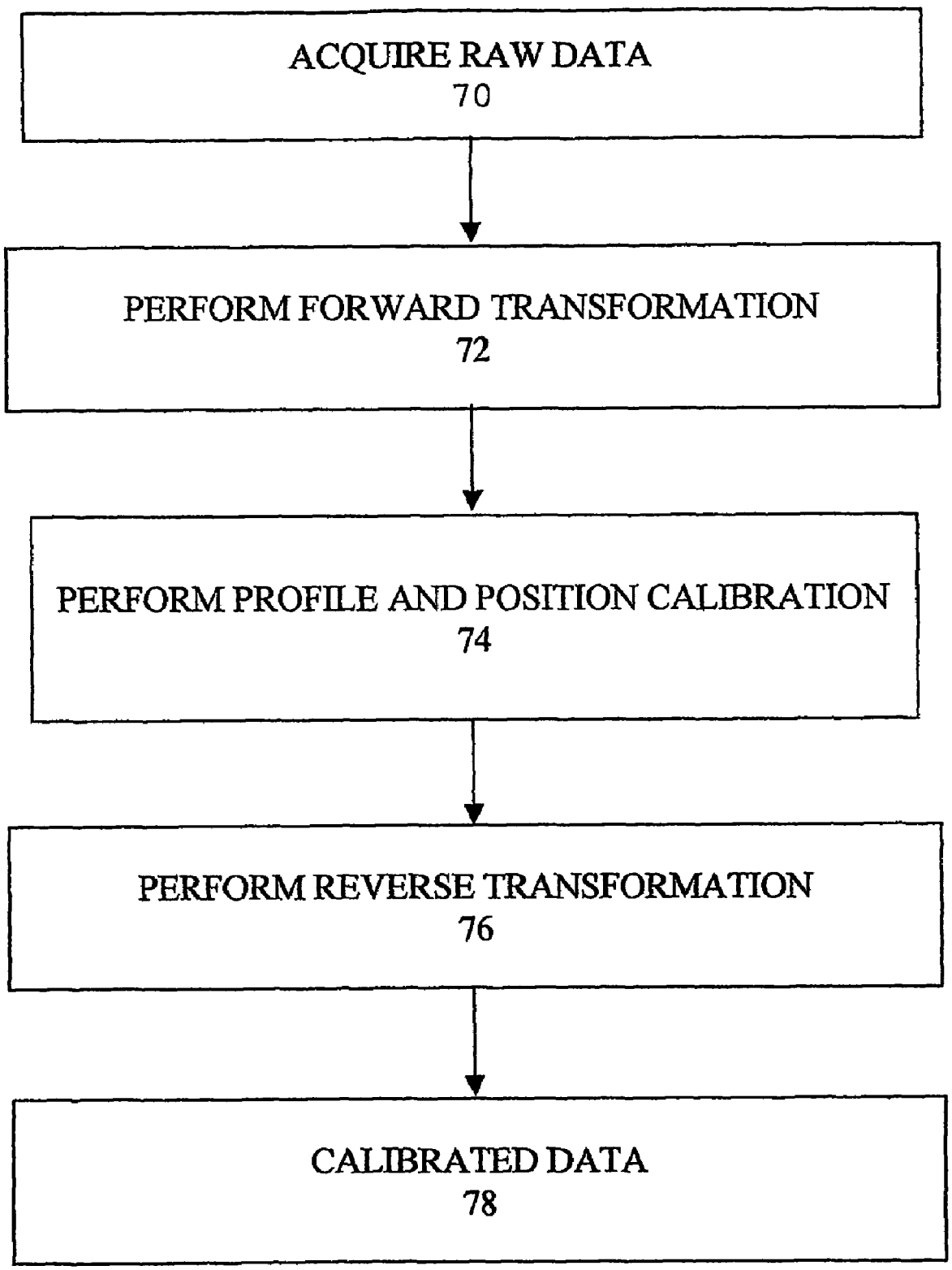
FIG. 4 is a very high level flow chart of the manner in which instrument calibration may be performed.

Referring to FIG. 4, generally in accordance with the invention, raw data is acquired at 70. At 72, a forward transformation to a more appropriate coordinate system is performed so as to compensate for variation in peak width as a function of peak position. Then profile and peak position calibration 74 are performed in accordance with the present invention, as set forth in detail below. At 76 a backward transformation of the data is performed to convert back into the original coordinate system. The result is calibrated data at 78.

A novel approach to processing mass spectrometry data will now be described which will combine mass spectrometer calibration and mass spectral peak analysis into one total calibration process to address all the issues discussed above. Proper and accurate mass spectrometer calibration in both mass and peak shape will provide a solid foundation for accurate peak identification, analyte quantitation, and sample classification during the next stage of mass spectral data analysis.

A description will now be given of mass spectral calibration according to an illustrative embodiment of the present invention. The description of mass spectral calibration will include descriptions relating to the following: mass spectral calibration standard; calculation of relative isotope abundances; mass pre-alignment; mass spectral peak shape functions; peak shape function interpolation; calibration filters and their interpolation; application of calibration filters, and error propagation through calibration filters.

Instead of calibrating mass alone without consideration of mass spectral peak shape and its mass-dependency, a complete calibration including all of these will be carried out as part of the overall process. There are a few key steps in this complete calibration process, which will be discussed in detail below.

The description of a mass spectral calibration will now be given according to an illustrative embodiment of the present invention. A calibration standard that has mass fragments scattered over the whole mass range will be selected to provide both mass calibration and mass spectral peak shape information. Due to the presence of naturally occurring isotopes in the elements that form the standard molecule, typically multiple isotope peaks can be observed for the same ion fragment at different abundances.

A commonly used standard in gas chromatography-mass spectrometry (GC/MS) is perfluorotributylamine (formula: $C_{12}F_{27}N$, molecular weight: 671). It has EI fragments at 69, 100, 119, 131, 169, 219, 264, 364, 414, 464, 502, etc. (see FIG. 5 for an example spectrum). This standard is typically imbedded in a commercial GC/MS instrument so that the molecule can be readily vaporized and diffuse into the MS system at the time of calibration through a computer-controlled valve.

Other standards under a variety of ionization schemes include polymers and synthetic peptides that can fragment into multiple well-characterized ion fragments covering the mass range of interest. In tandem MS systems where a second fragmentation is carried out, for example, one can obtain a mass spectrum with regularly spaced mass spectral peaks from a parent peptide ion due to the loss of successive amino acids during this secondary fragmentation p—a well-known process for peptide sequencing. Many intact proteins in ESI mode will carry multiple charges (z), sometimes from 1 to 10 or more, which will generate mass spectral peaks covering up to one order of magnitude or more in mass (m/z) range.

The description of the calculation of relative isotope abundances will now be given according to an illustrative embodiment of the present invention. On mass spectrometers that do not provide complete mass separation between different isotope peaks it is necessary to first calculate the relative isotope abundances and their exact mass locations. FIGS. 6A and 6B illustrate this limited mass separation between isotope peaks. A few published methods can be used to perform this theoretical calculation based on the elemental compositions, the known relative abundances of the elements contained in the ion fragment, and the electrical charges. Some of these methods are described by Alan Rockwood et al., in *Anal. Chem.*, 1995, 67, 2699, and by James Yergey, in *Int. J. Mass Spec. & Ion. Physics*, 1983, 52, 337, the disclosures of both of which are incorporated by reference herein.

For an ion fragment of the form $A_a B_b C_c D_d \ldots$, the isotope distribution is given by:

$$(\Sigma a_i A_i)^a (\Sigma b_i B_i)^b (\Sigma c_i C_i)^c (\Sigma d_i D_i)^d \ldots$$

where a, b, c, d, . . . are the number of atoms A, B, C, D, . . . , respectively, and $a_i$, $b_i$, $d_i$, . . . are the natural abundances for isotopes $A_i$, $B_i$, $C_i$, $D_i$, . . . , respectively. This expression can be expanded and re-organized to give the mass locations and abundances of all expected isotopes. For example, for the ion fragment in FIGS. 2A and 2B, it is known that it has electrical charge of one and elemental composition of $C_3F_5$, with the natural abundance for C and F given by:

$C^{12} = 12.000000$, $c_{12} = 0.9893$ $C^{13} = 13.003354$, $c_{13} = 0.0107$ $F^{19} = 18.998403$, $f_{19} = 1.0000$

The isotope masses (m) and relative abundances (y) for this ion fragment can therefore be calculated as $$m = \begin{bmatrix} 3C^{12} + 5F^{19} \\ 2C^{12} + C^{13} + 5F^{19} \\ C^{12} + 2C^{13} + 5F^{19} \\ 3C^{13} + 5F^{19} \end{bmatrix} = \begin{bmatrix} 130.992015 \\ 131.995369 \\ 132.998723 \\ 134.002077 \end{bmatrix}$$

$$y = \begin{bmatrix} c_{12}^3 \\ 3c_{13}c_{12}^2 \\ 3c_{13}^2 c_{12} \\ c_{13}^3 \end{bmatrix} = \begin{bmatrix} 9.6824 \times 10^{-1} \\ 3.1417 \times 10^{-2} \\ 3.3979 \times 10^{-4} \\ 1.2250 \times 10^{-6} \end{bmatrix}$$

Such isotope peak information (both mass locations and relative abundances) will be utilized later for the exact and complete calibration of mass spectral data.

The description of mass pre-alignment will now be given according to an illustrative embodiment of the present invention. In order to make more accurate peak shape interpolation in the next step, it is necessary to pre-align or pre-calibrate the standard mass spectrum first based on the identifiable isotope peak clusters across the spectrum. For each isotope peak cluster identified, a centroid is calculated as follows:

$$m_0 = \frac{y_0^T m_0}{y_0^T 1}$$

where $y_0$ is a column vector containing the actually measured mass spectral continuum data for the isotope cluster under consideration and the superscript T denotes transpose, i.e., a row vector containing all the same elements as the column version, $m_0$ is a column vector corresponding to the mass axis on which the isotope cluster is measured (can have either mass units or time units), and 1 is a column vector full of ones with the same length as $m_0$ or $y_0$. Similarly, another centroid can be calculated based on the calculated isotope distributions as follows:

$$m = \frac{y^T m}{y^T 1}$$

Thus a calibration relationship of the form $$m = f(m_0) \quad \text{(Equation 1)}$$

can be established through a least-squares linear or nonlinear fit between the centroids measured and the centroids calculated using all clearly identifiable isotope clusters available across the mass range.

Note again $m_0$ does not have to be in mass unit (m/z) but rather any physical unit which ion intensities are measured as a function of. In FTMS and TOF, $m_0$ comes naturally in time units and the first and second order terms in a polynomial fit become dominant for FTMS and TOF, respectively.

In MS systems that contain significant background signals due to the presence of either chemical noise or other particles such as neutrals, it may be beneficial to fit a lower order baseline using only the collected data before and after the mass spectral peaks of interest and subtract this baseline contribution from $y_0$ to effect a more accurate determination of the centroid, $m_0$. It will become obvious later on, however, that it is not critical to have the absolute mass calibration at this stage due to the refinement that comes with the total calibration filters.

The description of mass spectral peak shape functions will now be given according to an illustrative embodiment of the present invention. For each mass spectral peak cluster (including all significant isotope peaks) identified such as the one shown in FIGS. 6A and 6B, a mass spectral peak shape function at this mass can be derived through the following deconvolution:

$$y_0 = y \otimes p$$

where $y_0$ is the actually measured isotope peak cluster, y is the theoretically calculated isotope distribution for the particular ion fragment around this mass, and p is the peak shape function to be calculated. While $y_0$ is an actually measured mass spectrum continuously sampled in a given mass window and can be easily converted through interpolation onto equally spaced mass intervals, the theoretically calculated isotope distribution is defined only on discrete and irregularly-spaced masses, such as the (m,y) shown above.

A key step in making this deconvolution possible is by numerically convoluting a narrow Gaussian peak to both $y_0$ and y before the deconvolution, i.e., $$(g \otimes y_0) = (g \otimes y) \otimes p \text{ or } y_0' = y' \otimes p \quad \text{(Equation 2)}$$

This pre-convolution allows for continuously sampling both $y_0$ and y onto the same equally spaced mass intervals. In order to minimize noise propagation through this pre-convolution, it is important to use a Gaussian peak whose peak width is several times (for example, 4 times) smaller than the FWHM of an individual isotope peak. FIGS. 7A and 7B are diagrams respectively illustrating the measured isotope cluster 310 before and after Convolution, according to an illustrative embodiment of the present invention. FIGS. 7C and 7D are diagrams respectively illustrating the calculated isotope cluster 320 before and after pre-convolution, according to an illustrative embodiment of the present invention. The pre-convolution can be accomplished through either matrix multiplication or Fast Fourier Transform OFT) with zero filling, both well established in the open literature, for example, by William Press et al, in *Numerical Recipes in C, 2$^{nd}$* Ed, 1992, Cambridge University Press, p. 537, the entire disclosure of which is incorporated by reference herein.

Similar to pre-convolution, the deconvolution of y' from $y_0$' to obtain peak function p can be accomplished through either matrix inversion or EFT division. Due to the banded nature of the matrix, efficient computational algorithms are available from the open literature for the matrix inversion. Such algorithms are further described by Gene Golub et al., in *Matrix Computations*, 1989, Johns Hopkins University Press, p. 149, the entire disclosure of which is incorporated by reference herein. Alternatively, the efficient deconvolution can also be carried out through FFT division. In either case, it is critical to have proper noise filtering in place to control the noise propagation during the deconvolution process. This can be accomplished by discarding small singular values in the matrix approach before inversion or by replacing the real and imaginary part of the FFT division with interpolated values whenever division by a small number is encountered. The discarding of small singular values is flyer described by Yongdong Wang et al, in *Anal. Chem,* 1991, 63, 2750 and by Bruce Kowalski et al., in *J. Chemometrics,* 1991, 5, 129, the disclosures of both of which are incorporated by reference herein FIGS. 7E and 7F are diagrams respectively illustrating the derived peak shape function 330 thus calculated and the corresponding deconvolution residual 340, according to an illustrative embodiment of the present invention. It is desired to have the proper noise filtering in place dui the deconvolution such that the residual after the deconvolution is of a random nature with magnitude comparable to the expected noise level in the measured data $y_0$.

In MS systems that contain significant background signals due to the presence of either chemical noise or other particles such as neutrals, it may be beneficial to fit a lower order baseline using only the collected data before and after the mass spectral peaks of interest and subtract this baseline contribution from $y_0$ before the pre-convolution. The purpose of this baseline correction is to ensure that the baseline from actually measured match that of the theoretically calculated.

Figure 8:
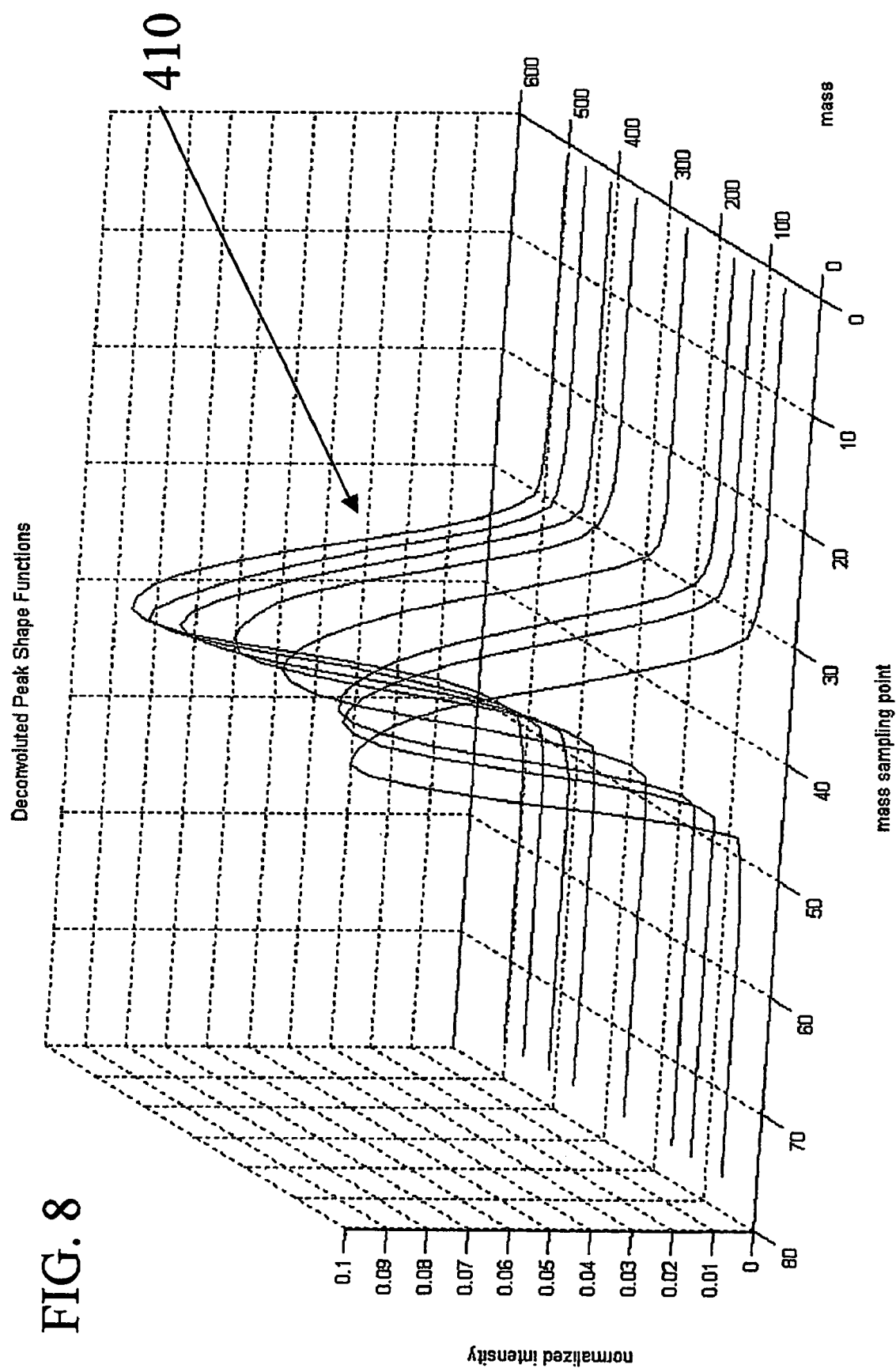
FIG. 8 is a diagram illustrating exemplary deconvoluted peak shape functions 410, according to an illustrative embodiment of the present invention.

The description of peak shape function interpolation will now be given according to an illustrative embodiment of the present invention. A few other peak shape functions can be calculated similarly from other well-characterized ion fragments across the mass spectral peak range from the mass spectrum of the same standard sample. FIG. 8 is a diagram illustrating exemplary deconvoluted peak shape functions 410, according to an illustrative embodiment of the present invention. In order to obtain peak shape functions for all other masses of interest within the mass spectral range, an interpolation on the few calculated peak shape functions will be required An efficient interpolation algorithm that also allows for noise filtering is devised. Instead of interpolation in the original mass spectral space, these few available mass peak shape functions will be collected in a matrix P to be decomposed through Singular Value Decomposition (SVD) first, $$\underline{P} = \underline{U}SV^T$$

where $\underline{P}$ is the peak shape function matrix with peak shape functions arranged in rows, $\underline{U}$ contains the left singular vectors in its columns, S is a diagonal matrix with descending singular values on the diagonal, and V contains the right singular vectors in its columns. SVD algorithm has been described by Gene Golub et al, in *Matrix Computations*, Johns Hopkins University Press, p. 427, the entire disclosure of which is incorporated by reference herein. Usually only a few (such as 3 to 4) singular values/vectors would be significant depending on the consistency of peak shape functions as a function of mass. For example, if all peak shape functions are exactly the same with only minor mass shifts among them, one expects only two significant singular values/vectors. If all peak shape functions are identical to each other with no mass shift, one would expect only one singular value/vector. This explains why a pre-alignment step is needed above m order to result in a more economic decomposition and interpolation with minimal number of singular values/vectors involved.

Figure 9:
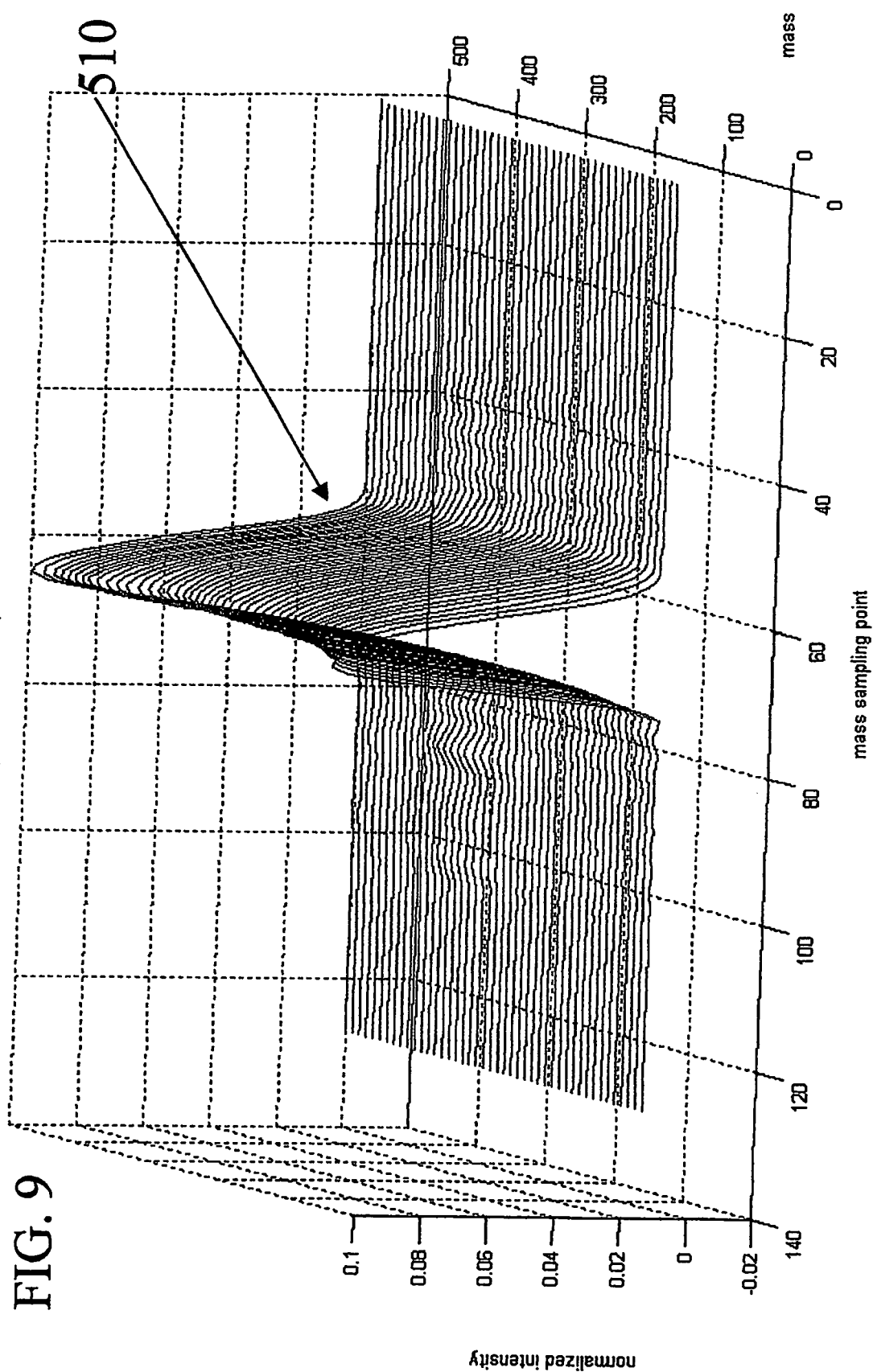
FIG. 9 is a diagram illustrating exemplary interpolated peak shape functions 510 based on the deconvoluted peak shape functions 410 of FIG. 8, according to an illustrative embodiment of the present invention.

When the elements of the left singular vectors are plotted against the mass, one expects a smooth dependence on the mass, a functional dependence amenable for accurate interpolation. A cubic spline interpolation can be easily applied to the first few columns in matrix $\underline{U}$ to obtain an expanded matrix U with many more number of rows that cover the full mass spectral range. An expanded peak shape function matrix P containing interpolated peak shape functions can be easily constructed via $$P = USV^T$$

where each row in P cons one peak shape function at any interpolated mass centroid. FIG. 9 is a diagram illustrating exemplary interpolated peak shape functions 510 based on the deconvoluted peak shape functions 410 of FIG. 8, according to an illustrative embodiment of the present invention.

It should be pointed out that the SVD decomposition here can also be replaced with other decompositions, such as wavelet decompositions, to arrive at similar results at a different computational cost.

The description of calibration filters and their interpolation will now be given according to an illustrative embodiment of the present invention. With the peak shape functions obtained, the MS instrument system is now fully characterized both in terms of its mass axis and its peak shape functions. Based on this characterization, a full mass spectral calibration can now be performed. This calibration will be carried out in a single operation where the peak shape functions at different masses will be converted into more desirable peak shape functions centered at exact mass locations (target peak shape functions). While any analytically or numerically calculated peak shape functions can in principle serve as target peak shape functions, it is desirable to have targets with the following properties: smooth peak functions and derivatives (for numerical stability); analytically calculatable functions and derivatives (for computational efficiency); symmetrical peak shapes (for accurate mass determination in later peak detection); resemble the true mass spectral peak shape (for simplified calibration filters); peak width (FWHM) slightly larger than actually measured peak width (for computational stability and signal averaging).

Figure 10:
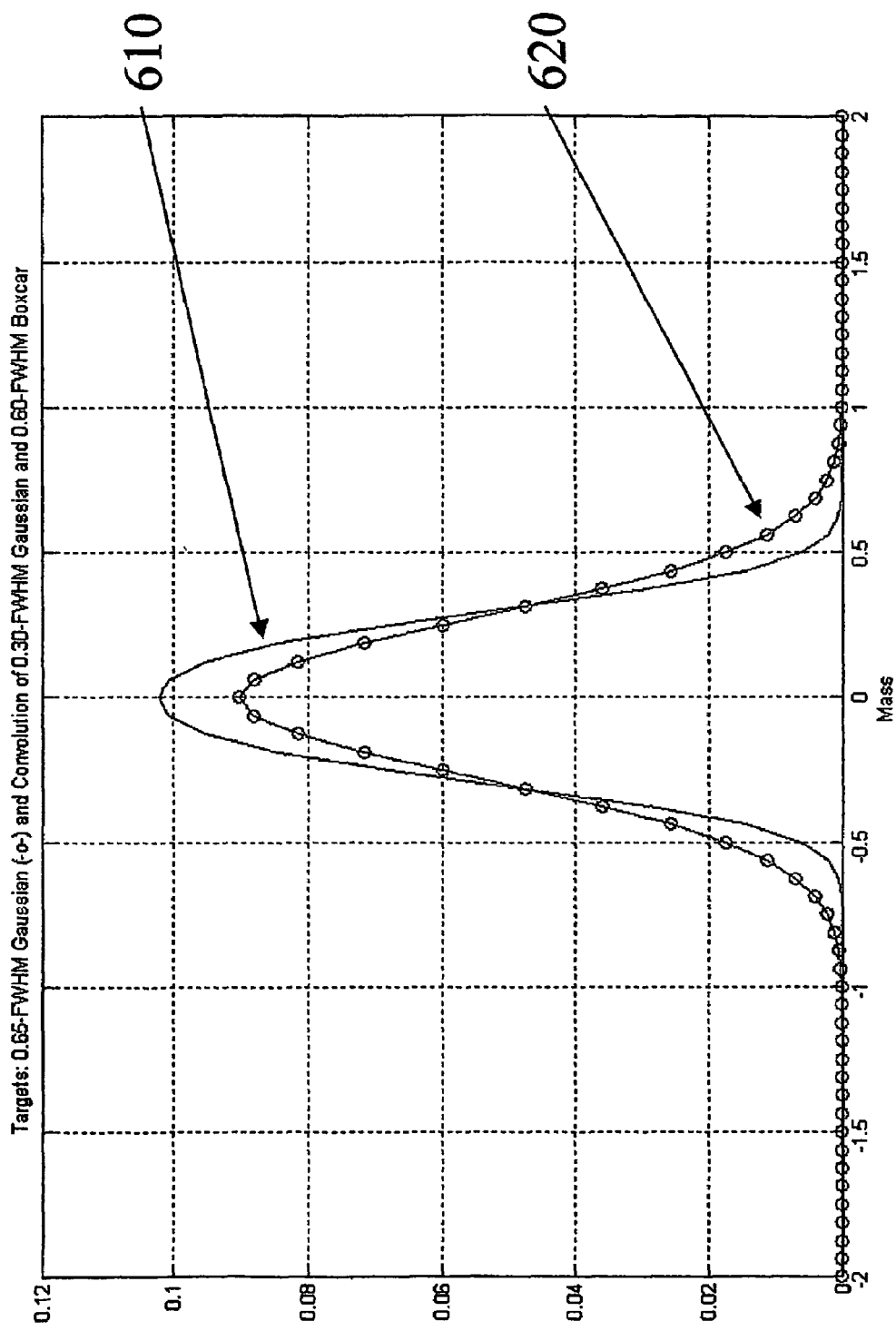
FIG. 10 is a diagram illustrating two exemplary targets 610, 620 that are preferred for mass spectrometry calibration, according to an illustrative embodiment of the present invention.

FIG. 10 is a diagram illustrating two exemplary targets 610, 620 that satisfy the preferred requirements for mass spectrometry calibration, according to an illustrative embodiment of the present invention. The two exemplary targets 610 and 620 satisfy the requirements described above. The two exemplary targets 610 and 620 are a Gaussian and the convolution of a Gaussian and a boxcar, respectively.

Figure 11:
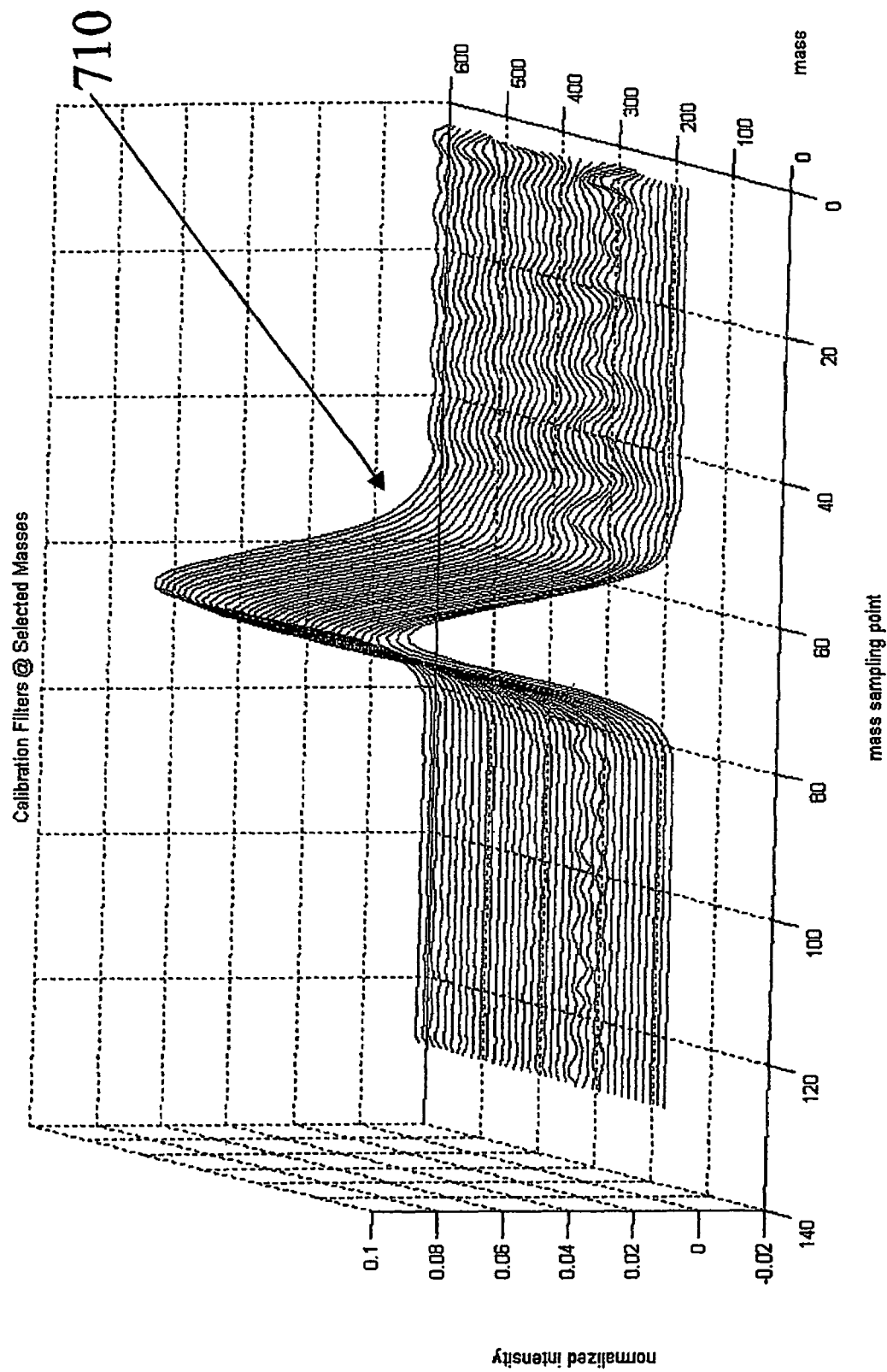
FIG. 11 is a diagram illustrating a collection 710 of calibration filters calculated for a set of masses, according to an illustrative embodiment of the present invention.

For each peak shape function p at a given centroid mass, a calibration filter f can be found such that:

$$t = p \circledast f \qquad \text{(Equation 3)}$$

where t is the target peak shape function centered at this given mass. This convolution would essentially convert the numerically calculated peak shape function p into a mathematically defined peak shape function centered at this exact mass location, accomplishing both mass and peak shape calibration in one convolution operation. The calculation of calibration filter f can be carried out in similar fashion to the deconvolution of peak shape functions through either matrix inversion or FFT division with appropriate noise filtering built-in. FIG. 11 is a diagram illustrating a collection 710 of calibration filters calculated for a set of masses, according to an illustrative embodiment of the present invention.

It can be seen that the calibration filters vary smoothly with masses, similar to the peak shape functions. Since interpolation is computationally more efficient than deconvolution operation in general, it may be computationally advantageous to calculate the calibration filters at coarsely spaced masses across the whole range (for example, at every 1-5 amu spacing) and interpolate the calibration filters onto a finely spaced grid afterwards (for example, ⅛ or 1/16 amu). The same approach described above for the interpolation of peak shape functions can be applied.

Alternatively, one can bypass the calculations of peak shape functions in Equation 2 all together and combine Equations 2 and 3 into a single-step process:

$$(t \circledast y) = y_0 \circledast f$$

where the convolution filters f at multiple standard masses can be calculated directly via matrix inversion or FFI division. An interpolation on these convolution filters will produce desired filters at specific masses (FIG. 11).

It should be noted at the calibration filters calculated here would serve two purposes simultaneously the calibration of mass spectral peak shapes and mass spectral peak locations. Since the mass axis has already been precalibrated above, the mass calibration part of the filter function is reduced in this case to achieve a further refinement on mass calibration, i.e., to account for any residual mass errors after the least squares fit given by Equation 1.

This total calibration process should work well for quadrupole-type MS including ion traps where mass spectral peak width (Full Width at Half Maximum or FWHM) is expected to be roughly consistent within the operating mass range For other types of mass spectrometer systems such as magnetic sectors, TOF, or FTMS, the mass spectral peak shape is expected to vary with mass in a relationship dictated by the operating principle and/or the particular instrument design. While the same mass-dependent calibration procedure described so far is still applicable, one may prefer to perform the total calibration in a transformed data space consistent with a given relationship between the peak width and mass/location.

In the case of TOF, it is known that mass spectral peak width (FWHM) $\Delta m$ is related to the mass (m) in the following relationship:

$$\Delta m = \alpha \sqrt{m}$$

where $\alpha$ is a known calibration coefficient. In other words, the peak width measured across the mass range would increase with the square root of the mass. With a square root transformation to convert the mass axis into a new function as follows:

$$m' = \sqrt{m}$$

where the peak width (FWHM) as measured in the transformed mass axis is given by $$\frac{\Delta m}{2\sqrt{m}} = \frac{a}{2}$$

which will remain unchanged throughout the spectral range.

For an FT MS instrument, on the other hand, the Peak width (FWHM) $\Delta m$ will be directly proportional to the mass m, and therefore a logarithm transformation will be needed.

$$m' = \ln(m)$$

where the peak width (FWHM) as measured in the transformed log-pace is given by $$\ln\left(\frac{m + \Delta m}{m}\right) = \ln\left(1 + \frac{\Delta m}{m}\right) \approx \frac{\Delta m}{m}$$

which will be fixed independent of the mass. Typically in FTMS, $\Delta m/m$ can be managed on the order of $10^{-5}$, i.e., $10^5$ in terms of the resolving power $m/\Delta m$.

For a magnetic sector instrument, depending on the specific design, the spectral peak width and the mass sampling interval usually follow a known mathematical relationship with mass, which may lend itself a particular form of transformation through which the expected mass spectral peak width would become independent of mass, much like the way the square root and logarithm transformation do for the TOF and FTMS.

While the transformations discussed above go a long way to providing an enhanced calibration, it is desirable to have a more general form of transformation that applies to all instruments. This is because, for example, a square root transformation is of limited applicability and a logarithmic transformation tends to make peaks at low mass too wide, and peaks at high mass too narrow for efficient calculations to be performed.

In accordance with this more general technique, which includes the more specific approaches noted above, a first step is the measurement of the peak width as a function of mass through the measurement of a standard or a standard mixture from which multiple well placed peaks can be observed across the mass range of interest. This standard may be the same as that used for mass spectral instrument calibration. In the case of medium resolution mass spectrometry such as unit-mass resolution or lower, it is necessary to go through the deconvolution process outlined above, using isotope abundance calculations to arrive at the peak shape function before measuring the peak wide.

Examples of the standard may include:
A peptide mixture;
A protein mixture; or
A polymers such as PPG or PEG or poly-alanine (an amino acid) which form a rag of peaks with 71 amu spacing across a fairy extensive mass range of up to 2000 amu based on multiple monomer combinations. On high resolution systems, the distribution of isotopes becomes more significant than the instrument peak shape functions. For example, on qTOF mass spectrometer systems, there maybe enough separation between the monoisotopic peak and peaks from other isotopes that one can read the instrument peak shape functions directly off the measured monoisotopic peak without going through a deconvolution process involving isotope distributions. On MS systems with very low mass resolution, such as the SELDI PBSII system from Ciphergen Biosystems in Fremont, Calif., the isotope distribution which comes in nominally one mass unit spacing (single charge) or 1/z mass unit spacing (multiple charges z) becomes so insignificant at high masses that one can treat the observed mass spectral peak as coming solely from the instrument peak shape function and thus eliminate the deconvolution steps outlined above.

The observed peak width on a mass spectrometer is contributed to by the mass analyzer itself such as the flight tube in a TOF MS, the ionization source (variations in ion energy into the tube of a TOF MS result in time variation out of the tube, or in a quadrupole MS, variations in ion energy into the quadrupole result in a spatial and/or time distribution of ions leaving the quadrupole), the flow rate of gas or liquid sample into the ionization source, etc. In the case of TOF MS, the square root dependence of peak width arising from the flight tube alone will be turned into a more general quadratic relationship observed in the raw data when all contributing factors are taken into considerations.

A least squares fit to the observed peak width ($\Delta m$) verses mass (m) results in an analytical expression of the peak width as a function of mass, $\Delta m(m)$. When there is a strong dependence of peak width on mass, it is preferred to transform the mass axis through some function f(m) such that the peak width (for example, fill width at half maximum or FWHM) as observed in the transformed axis f(m) becomes a constant across the mass range, $$f(m_1)-f(m_0)=f(m_0+\Delta m)-f(m_0)=\text{Constant}$$

With Taylor series expansion and other derivations, the above relationship can be converted into $$\left[f(m_0) + \frac{df}{dm}\Delta m\right] - f(m_0) = \text{Constant} = d$$

$$\frac{df}{dm}\Delta m = d$$

$$\frac{df}{dm} = \frac{d}{\Delta m}$$

$$f(m) = \int \frac{d}{\Delta m(m)} dm \propto \int \frac{1}{\Delta m(m)} dm$$

where the integration is performed over the entire range of masses, and where the constant d and an integration constant have been ignored without impacting the purpose of transformation.

In the case of an LC qTOF MS instrument, a quadratic relationship exists of the form:

$$\Delta m = am^2 + bm + c$$

The transformation according to the integration above is given by $$f(m) \propto \ln\left|\frac{m-r_1}{m-r_2}\right|$$

where $r_1$ and $r_2$ are the two roots of the quadratic form given above. In a more specific case of, for example, a qTOF II instrument manufactured by Waters MicroMass, the peak width has been found to relate to mass in the following relationship $$\Delta m = 3.53e-8m^2 + 1.35e-4m + 1.32e-2$$

with $$r_{1,2} = [-100 \; -3724]$$

and therefore a transformation of the form $$f(m) \propto \ln\left(\frac{m-100}{m-3724}\right)$$

Some other examples of the transformations:

FTMS:

$$\Delta m \propto m, f(m) \propto \ln(m)$$

TOF analyzer part (flow and sample consideration not considered):

$$\Delta m \propto \sqrt{m}, f(m) \propto \sqrt{m}$$

Low energy ionization GC/TOF:

$$\Delta m \propto bm+c, f(m) \propto \ln(bm+c)$$

High energy ionization MAIDI TOF:

$$\Delta m \propto m^2, f(m) \propto \frac{1}{m}$$

In each case, an appropriate integral is taken, and an expression is derived in the manner explained above. For example in some LC TOE MS instrument, the quadratic term may not be significant, and there is an essentially linear relationship of the form $\Delta m=bm+c$ which gives rise to a transformation $\ln(bm+c)$. In an instrument where the peak width is proportional to the square of the mass, it may be appropriate to use a transformation that is related to the reciprocal of the mass, as noted above.

When the expected mass spectral peak width becomes independent of the mass, due either to the appropriate transformation such as logarithmic transformation on ETMS and square root transformation on TOF-MS or the intrinsic nature of a particular instrument such as a well designed and properly tuned quadrupole or ion trap MS, huge savings in computational time will be achieved with a single calibration filter applicable to the full mass spectral range. This would also simplify the requirement on the mass spectral calibration standard: a single mass spectral peak would be required for the calibration with additional peak(s) (if present) serving as check or confirmation only, paving the way for complete mass spectral calibration of each and every scan of the mass special data based on an internal standard added or mixed into the sample prior to its measurement.

The description of the application of the calibration filters will now be given according to an illustrative embodiment of the present invention.

The calibration filters calculated above can be arranged into the following banded diagonal filter matrix:

$$F = \begin{bmatrix} f_1 & & & \\ & \ddots & & \\ & & f_i & \\ & & & \ddots \\ & & & & f_n \end{bmatrix}$$

in which each short column vector on the diagonal, $f_i$, is taken from the convolution filter calculated above for the corresponding center mass. The elements in $f_i$, is taken from the elements of the convolution filter in reverse order, i.e., $$f_i = \begin{bmatrix} f_{i,m} \\ f_{i,m-1} \\ \vdots \\ f_{i,1} \end{bmatrix}$$

This calibration matrix will have a dimension of 8,000 by 8,000 for a quadropole MS with mass coverage up to 1,000 amu at ⅛ amu data spacing. Due to its sparse nature, however, typical storage requirement would only be around 40 by 8,000 with an effective filter length of 40 elements covering a 5-amu mass range.

Figure 12:
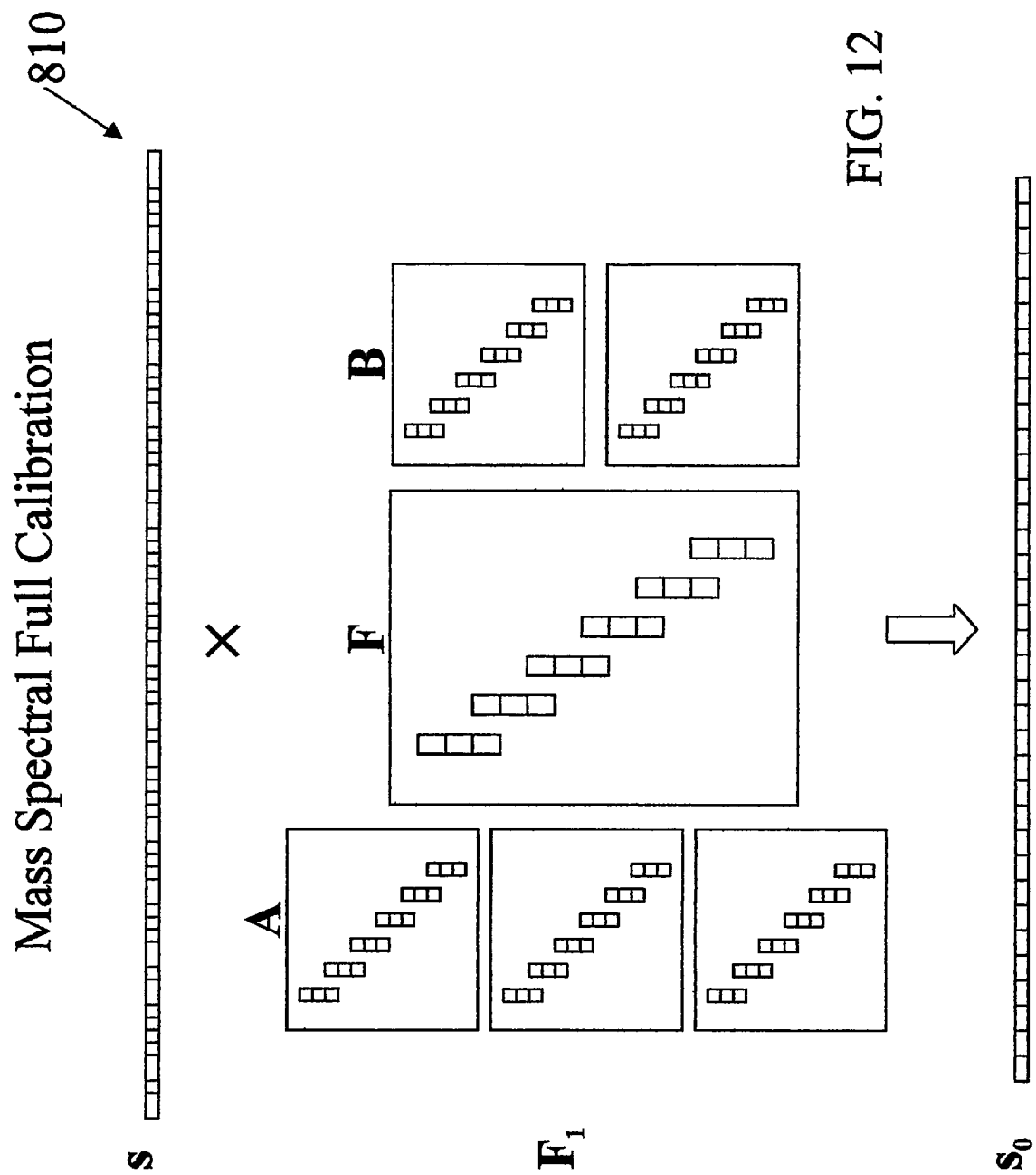
FIG. 12 is a diagram illustrating a graphical representation 800 of the filter matrix application combined with interpolations and mass pre-alignment, according to an illustrative embodiment of the present invention.

FIG. 12 is a diagram illustrating a graphical representation 800 of the filter matrix application combined with interpolations and mass pre-alignment, according to an illustrative embodiment of the present invention. There are three components to the total calibration: Pre-calibration matrix A; Calibration matrix F; and Post-calibration matrix B.

Pre-calibration matrix A takes on the form of a banded diagonal with each nonzero column along the diagonal performing an essentially interpolation function. This interpolation function can include: (a) conversion from non-uniformly spaced raw MS data into uniformly-spaced MS data; (b) pre-alignment of the mass axis; and (c) proper transformations for TOF, FIMS, magnetic sector instruments, or other instruments as needed.

Calibration matrix F is a banded diagonal matrix to perform both peak shape and mass axis calibration.

Post-calibration matrix B, similar to pre calibration matrix A, takes on the form of a banded diagonal with each nonzero column along the diagonal performing another interpolation function. This interpolation function can include: (a) conversion from the internal uniform spacing into either uniform or nonuniform output spacing and (b) transform back into the linear mass space for TOF, FIMS, magnetic sector instruments, or other instruments as needed.

The factorization shown in FIG. 12 is made possible by Lagrange interpolation where the interpolation can be structured as a filtering operation independent of the y-values on which the interpolation operates. Lagrange interpolation algorithm is described by William Press et al, in *Numerical Recipes in C, 2$^{nd}$ Ed*, 1992, Cambridge University Press, p. 105, the entire disclosure of which is incorporated by reference herein. On instruments that output raw mass spectrum at predefined mass intervals, all three matrices can be pre-calculated as part of the calibration process and multiplied beforehand into an overall filtering matrix $F_1 = AFB$ which will have a banded structure similar to F with different elements. At runtime for each mass spectrum acquired, only one sparse matrix multiplication is required $s_0 = sF_1$ where s is a row vector containing raw MS data and $s_0$ is another row vector containing fully calibrated MS data at desired output spacing. The real time portion of this operation is expected to be computationally efficient as it is basically to filter the raw un-calibrated data into fully calibrated MS data for output. On some MS instruments, each mass spectrum is acquired at different and non-uniform mass intervals. In this case, the pre-calibration matrix A is different for each acquisition, with only F and B matrices fixed until the next time a calibration is performed. These two matrices can be pre-multiplied with the following real time operation $s_0 = sA(FB)$ which will be computationally more expensive due to the extra interpolation or multiplication step for each acquisition. Alternatively, one may choose to interpolate each scan through an inexpensive linear interpolation onto a pre-defined mass interval and thus improve the computational efficiency by keeping the total calibration filtering matrix $F_1 = AFB$ unchanged from scan to scan.

It should be noted that in some instrument systems, it may be possible to carry out the fill mass spectral calibration on each individual acquisition on-the-fly. For example, on FTMS or TOF, after the logarithm or square root transformation, only one deconvolution sequence is required for an MS peak (internal standard peak) through Equations 2 and 3 to construct a new banded diagonal matrix F with the identical nonzero elements contained along the diagonal while both A and B may be kept unchanged. The fill calibration thus developed could then be applied to the same original MS spectrum to effect a full calibration on all peaks (including the internal standard peak and other unknown peaks to be analyzed). The same on-the-fly calibration can be applied to other MS systems where the peak shape functions are effectively independent of the mass with or without the transformation, requiring the minimum of one MS peak located anywhere within the mass range as the internal standard on which to derive the filter matrix F with identical nonzero elements along its diagonal. The internal standard will be a selected compound having well characterized isotope clusters and can be into the sample or flow during sample preparation steps beforehand, infused and mixed online in real time, such as reserpine injected either on the column or post column via T-connectors in an LC/MS experiment. In order to reduce the ion suppression caused by an internal standard, one may have the internal standard continuously ionized in a separate ionization source before mixing into the ions from the sample stream, such as the multiplexing ESI spraying source from Waters Corporation in Waltham, Mass., or dual ESI lock spray source from Agilent Technologies in Palo Alto, Calif.

One may carry out some parts of this full calibration through an updating algorithm to combine external standards (through a different MS acquisition) with internal standards (within the same MS acquisition) in a computationally efficient way. For example, one may apply the last available full calibration based on the most recently measured external standard to an unknown sample containing an internal standard peak. By checking the exact mass location and the peak shape of the internal standard after the calibration (see next section below for peak analysis), one may find that the peak shape has not changed and there exists only a minor mass shift. As a result, FB could be kept the same requiring only a small update on matrix A, which is fully capable of shift compensation.

A more comprehensive updating through the combination of external and internal calibration will involve applying the external calibration and updating it through another fill calibration procedure using at least one internal standard. One reason for combining both an external calibration and an internal calibration is to deal with inherent instrument drift. For example, variations in instrument calibration with respect to an external standard may occur due to changes in temperature that cause dimensional changes, changes in voltages applied to various parts of the mass spectrometer, and buildup of various materials on ion sources. This drift in calibration occurs as a function of time, and is generally different for different masses. This drift may be of a magnitude greater than the theoretical accuracy of the instrument due to ion counting noise, thus greatly reducing actual instrument accuracy, sometimes by factors of more than ten.

Mathematically, calibration using a combination of an external standard and an internal standard may be represented as:

$$Y_{EI} = (Y \otimes F_E) \otimes F_I$$

Y is raw data, to which an external calibration filter $F_E$ (in same form as total calibration filter $F_I$ from above) is applied, with an internal calibration filter $F_I$ (again in the same form as $F_I$ from above) being applied to the result, to produce the data $Y_{EI}$ that is both externally and internally calibrated.

Operationally, the sample data containing at least one internal standard undergoes an external calibration $F_E$, which converts raw sample data into externally calibrated data. This externally calibrated data trace is then treated as an external standard data trace, undergoes the necessary transformation, deconvolution with the internal standard's isotope distribution to arrive at a real-fame and updated peak shape function, interpolation or simply replicating to cover the whole spectral range, another deconvolution to calculate the additional filters ($F_I$) so as to correct for any deviation to the target peak shape function specified for the external calibration $F_E$, interpolation on the filters if necessary, and transformation if necessary back into the original space. In other words, the whole calibration process is repeated one more time using the externally calibrated data trace as the input or raw into the calibration procedure disclosed herein to arrive at $F_I$.

Figure 13:
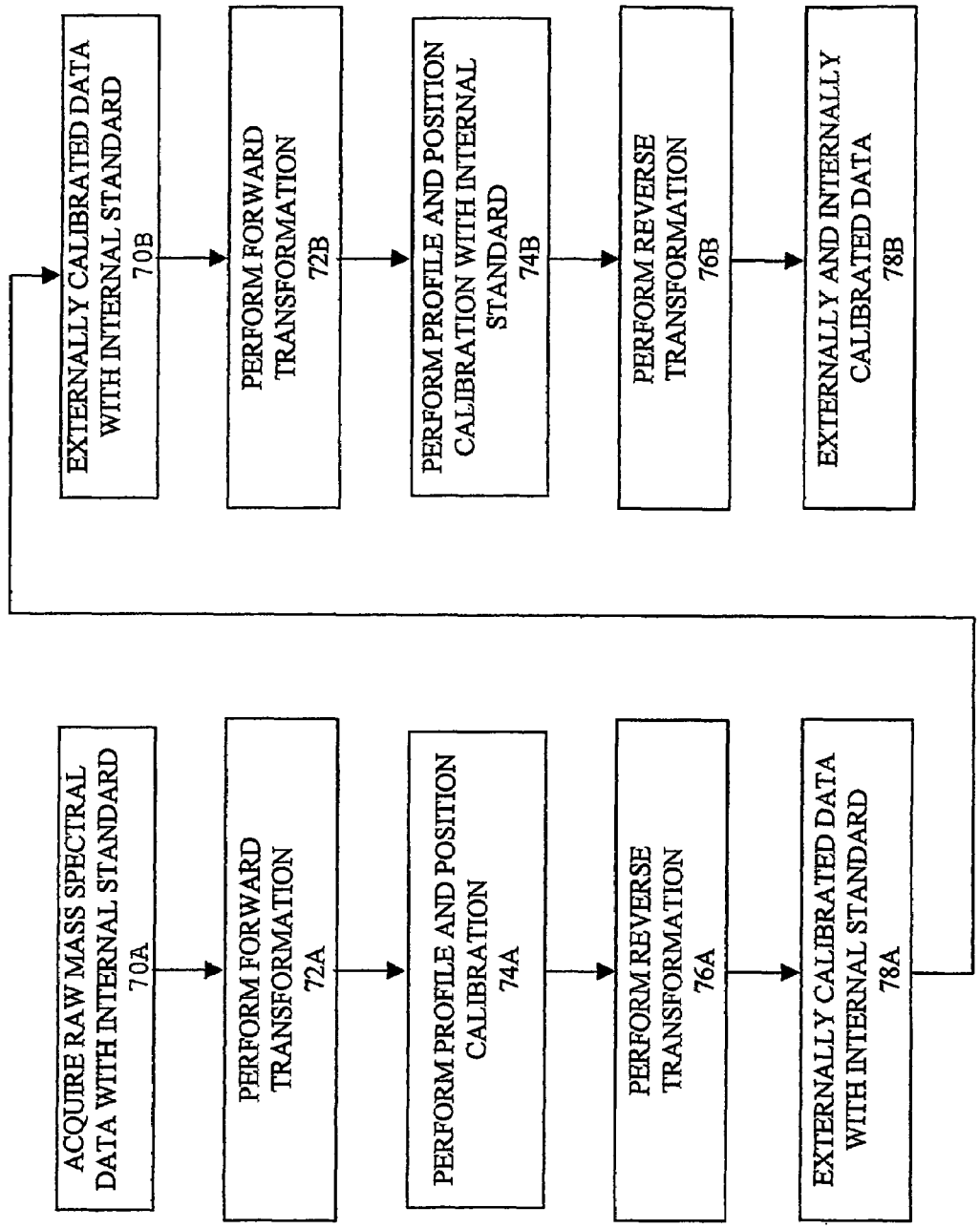
FIG. 13 is a very high level flow chart of the manner in which both external and internal instrument calibration may be performed.

FIG. 13 is similar to FIG. 4, but the general steps in FIG. 4 have been re-designated with the suffix "A". What is different is the use of data acquired from a sample containing an internal standard at 70A (such as one of the compounds described above). This data undergoes steps 72A, 74A, 76A to produce externally calibrated data at 78A. The results are used at 70B as an input to an internal calibration process at 72B, 74B and 76B, wherein a additional calibrating filter is produced, that, when combined with the external calibrating filter, takes into account both external and internal calibration. Data which is both externally and internally calibrated, is available for use at 78B.

In accordance with this aspect of the invention, transformations are advantageously performed using the same relationships, in the same transformation space, as those used in determining peak placement and peak shape, as described above.

It will be understood that one way to effectively use this approach is to do an external calibration, for example, once a day (before starting instrument measurements) or every few hours, depending on the nature of instrument drift. Calibration according to the internal standard may be accomplished more frequently, and in the limit may be performed for each mass spectral scan during every sample run.

The approach disclosed above is advantageous in that a single internal standard is all that is needed to perform the calibration, thus minimizing the introduction of materials not originating in the sample of interest. However, if necessary or desirable in a particular application, more than one internal calibration standard may be used. In some applications, the internal standard is readily available as part of the sample, for example, the drug itself as internal standard when drug metabolites are being analyzed during an LC/MS run where the known drug (or known metabolites) and unknown metabolites may co-elute or elute near each other in retention time to be used as naturally occurring internal standard(s).

The description of error propagation through the calibration filters will now be given according to an illustrative embodiment of the present invention.

In order to properly identify and quantity mass spectral peak, it is important to estimate the variance in the calibrated MS data. For the majority of MS instruments, the random error on ion intensity measurement is dominated by ion counting shot noise, i.e., the variance in raw MS data is proportional to the ion signal itself. The variance spectrum of the calibrated MS spectrum $s_0$ is therefore given by:

$$\sigma^2 \propto s F_2 \qquad \text{(Equation 4)}$$

where $F_2$ is the same size as $F_1$ with all corresponding elements in $F_1$ squared. This turns out to be just one more filtering on the same raw MS data with all filter elements squared.

FIGS. 14A, 14B, and 14C are diagrams illustrating a first segment 910 and a second segment 920 of a Mass Spectrometry (MS) spectrum before and after fill calibration (both FIGS. 14A and 14B) and the variance spectrum 930 FIG. 14C), according to an illustrative embodiment of the present invention.

A description will now be given of mass spectral peak analysis according to an illustrative embodiment of the present invention. The description of mass spectral peak analysis will include descriptions relating to the following: peak matrix construction; Weighted Multiple Linear Regression (WMLR); detection of significant peaks; and refinement for peak analysis.

An MS spectrum after fill calibration described above would be ideally suited for efficient, reliable, and highly sensitive peak detection. As will become clear later in this section, while peak analysis can be carried out in either the natural mass unit or the transformed unit (for FTMS or TOF or other instruments), significant computational savings can be achieved to perform the mass spectral peak analysis in a transformed space (also referred to herein as "calibrated space") where peak shape functions are of the same width across the full mass range.

The present invention is particularly useful for the following:

Extensive mass spectral calibration; and

Peak detection, accurate mass assignment, peak area integration, and statistical measures for the probability of a peak presence, mass accuracy, and peak area confidence interval.

The principles for both aspects of the invention apply to other instrumentation as well, especially the aspects of the invention dealing with peak determination or peak detection, which is a challenging issue in LC, GC, CE, and even nuclear magnetic resonance (NMR).

Figure 15A:
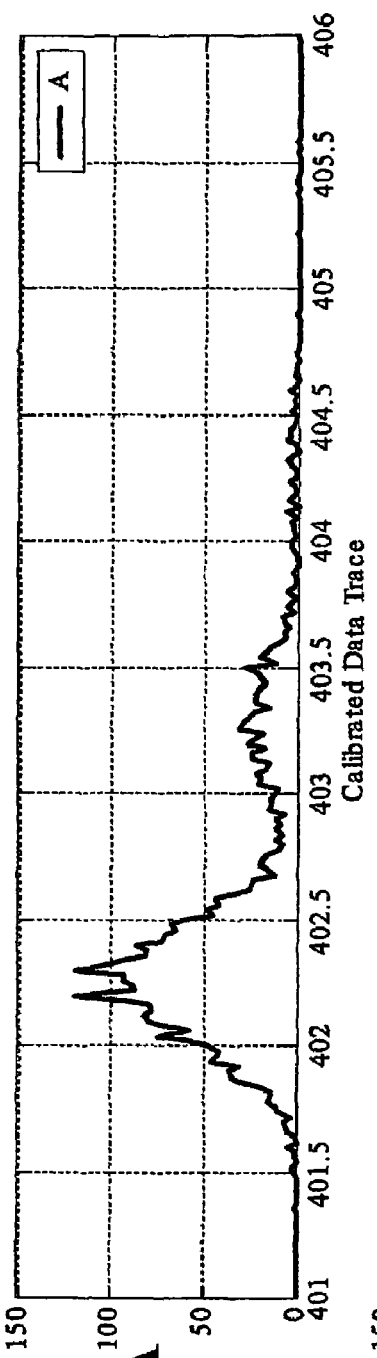
FIGS. 15A is a data trace, containing noise, that may be from an instrument other than a mass spectrometer.

In the presence of measurement noise, a data trace in the form of FIG. 15A may be observed. This data trace may come from, for example, a single channel UV detector operating at 245 nm to detect proteins or peptides separated from a liquid chromatography separation column, a refractive index detector attached to the same, a flame ionization detector attached to a gas chromatography separation column, a fluorescence detector attached to the end of a electrophoresis channel after separating DNA fragments attached with fluorescence dyes, etc. It is highly desirable to have a robust and sound peak detection algorithm in these applications so that the presence or absence of certain analyte such as a DNA fragment or a particular peptide can be assessed along with quantitative information such as the amount of each and qualitative information such as the time when each analyte arrives at the detector. The x-axis does not necessarily need to be time, as examples from NMR would be equally applicable where the x-axis is the ppm shift in resonance frequency.

The intrinsic peak shapes in FIG. 15A are not symmetrical and may vary with the x-axis variable such as time or frequency, just as do the mass spectral peak shape functions in a mass spectral trace not being symmetrical and changing with mass (m/z). One may prefer to calibrate the peak shape functions into a known mathematical function possessing the following properties in order to take advantage of all the precise computational properties disclosed herein:

Symmetrical peak shape functions for fast computation via shifting

Figure 15B:
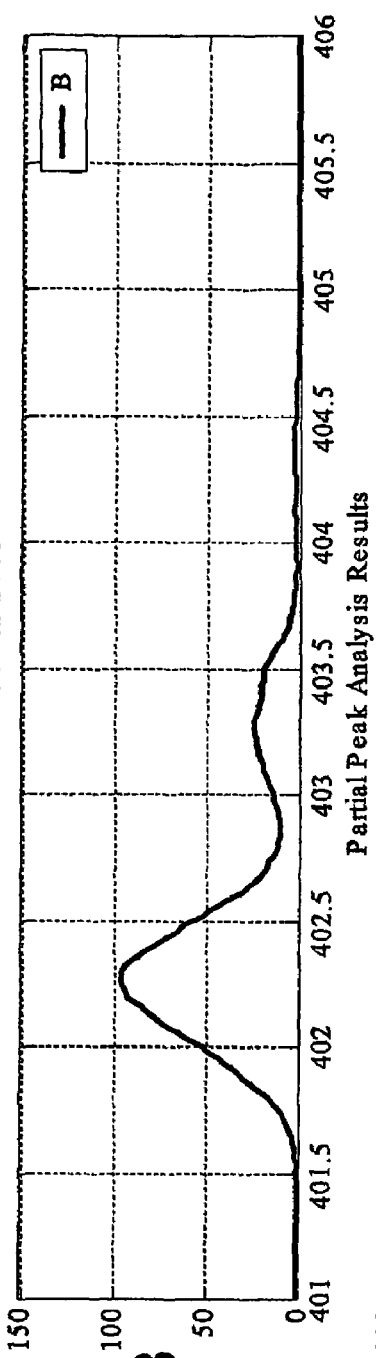
FIG. 15B illustrates the calibrated data trace after applying calibration filters to the data trace in FIG. 15A.

Uniform peak shape functions across the entire range for numerical stability and minimized error propagation The calibration involves running a mixture of well spaced and well separated compounds so as to establish a set of measured peak shape functions across the entire range of interest, from which the peak shape functions at any given point within the range can be numerically calculated through interpolations using Lagrange interpolation, SVD interpolation, wavelet interpolation, or any other well established interpolation approaches, all mentioned herein. These measured peak shape functions can then be transformed into a desired target peak shape functions such as a Gaussian or a convolution of Gaussian and box car of certain appropriate widths through calibration filters disclosed herein FIG. 15B shows the calibrated data trace after applying the calibration filters to the data trace in FIG. 15A. As can be seen, a significant degree of noise filtering has occurred through the application of calibration filters that also transformed the peak shape functions into symmetrical peak shape functions with equal width across the entire range. The selection of target peak shape width should be such that the target peak shape width is slightly wider than the measured peak width to insure a good amount of noise filtering and signal averaging, but should not be too much wider than the measured peak width to cause a significant degradation of resolution.

Figure 15C:
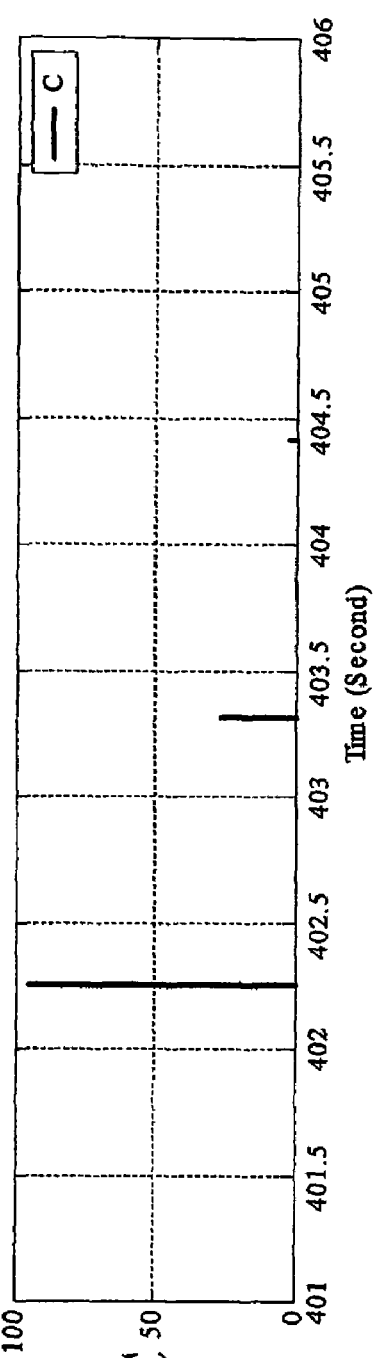
FIG. 15C illustrates partial results of peak analysis of the data of FIG. 15B as sticks with all the peak locations and peak areas as indicated.

With the peak shape functions either measured exactly from a standard mixture or calculated from a mathematical function after the application of calibration filters, one may proceed to build the peak component matrix and apply WMLR (Weighted Multiple Linear Regression), in an iterative fashion if necessary, in order to perform peak analysis for the many unknown samples to come afterwards until the next time a calibration standard mixture is run through the system. The results of such peak analysis is a list of peaks detected, the peak locations, the peak areas, and all the corresponding statistics on probabilities of peak presence or absence and the confidence intervals for each. FIG. 15C shows the partial results of the peak analysis as sticks with all the peak locations and peak areas as indicated.

As in the case of mass spectral calibration outlined above, one may prefer to convert the time or frequency axis into a new space before performing the peak shape determination and transformation, and one may want to add an internal peak standard into each sample allowing for both external and inter calibration to achieve the highest possible accuracy.

The description of peak matrix construction will now be given according to an illustrative embodiment of the present invention. The peak analysis problem is formulated as follows: a mass spectral trace is a linear combination of many peaks of known peak shapes located normally at 1/z mass unit apart with peak center offsets reflecting mass defects. For singly charged ions (z=1), the nominal spacing would be 1 mass unit apart with some offsets in either positive or negative directions to reflect the mass defects. The mass spectral peak analysis problem can then be formulated as a Multiple Linear Regression (MLR):

$$s_0 = cP + e \quad \text{(Equation 5)}$$

where $s_0$ is a row vector containing the fully calibrated MS spectrum, P is the peak component matrix containing nominally spaced known peak functions (each with analytically integrated area of unity) in its rows, c is a row vector containing the integrated peak intensities for all nominally spaced peaks, and e is the fitting residual. To account for baseline contributions, baseline components such as offset, $1^{st}$ order linear term or other higher order nonlinear functional forms can be added into the rows of the P matrix with the corresponding row vector c augmented by the corresponding coefficients to represent the contributions (if any) of these baseline components.

Note that the full mass spectral calibration described above allows for analytically calculating the peak component matrix P in which all peaks would integrate to unit area analytically, leading to the corresponding estimates in c automatically reporting analytically integrated area, free from the interferences from other peaks (such as other isotope peaks) located nearby with automatic noise filtering and signal averaging (left in e). For the very same reason, it is also possible to perform unbiased isotope ratio measurement between nearby isotope peaks.

Furthermore, the construction of peak component matrix P can be made computationally more efficient by performing the above full MS calibration to output calibrated MS data at an exact fraction of the nominal mass spacing, for example, at $1/4$, $1/5$, $1/8$, $1/10$, $1/12$, $1/16$ of 1 amp. This way, the peak shape function will only need to be evaluated once for one row i P with other rows formed by simply shifting this row forward or backward. It is noted that the nominal mass spacing mentioned in connection with the discussion of this invention refers to either 1 mass unit spacing for singly charged ions or 1/z mass unit spacing for ions of charge z.

The description of Weighted Multiple Linear Regression (WMLR) will now be given according to an illustrative embodiment of the present invention. Since the error term e does not have uniform variance across the mass spectral range as indicated in the calibration section, a Weighted Multiple Linear Regression (WMLR) will need to be performed instead of the ordinary MLR, $$s_0 \text{diag}(w) = cP \text{diag}(w) + e \quad \text{(Equation 6)}$$

where diag(w) is a diagonal matrix with the weights along the diagonal given by Equation 4, $$w = 1/\sigma^2 = 1/(sF_2)$$

where the shared proportional constant among all masses have been dropped with no impact on the regression.

A least squares solution to Equation 6 will give $$c = s_0 \text{diag}(w) P^T [P \text{diag}(w) P^T]^{-1} \quad \text{(Equation 7)}$$

and its variance estimated as $$s^2\{c\} = e^2 \text{diag}\{[P \text{diag}(w) P^T]^{-1}\} \quad \text{(Equation 8)}$$

where $e^2$ is based on the weighted squared deviations $$e^2 = e \text{diag}(w) e^T / df$$

with e given by the fitting residual in Equation 5 and df being the degrees of freedom, defined as the difference between the number of independent mass spectral data points and the number of rows included in matrix P (number of coefficients in c to be estimated). The least squares solution to Equation 6 is further described by John Neter et al., in *Applied Linear Regression*, $2^{nd}$ Ed., Irwin, 1989, p 418, the entire disclosure of which is incorporated by reference herein.

For an MS instrument with mass range reaching 1,000 amu with mass interval of ⅛ amu, the peak component matrix P will typically be 1,000 by 8,000 but largely sparse with no more than 40 nonzero elements (covering 5-amu mass range) in each peak row (baseline components have all nonzeros in the corresponding rows). The data storage efficiency can be drastically enhanced through indexing to take advantage of the fact that the peak components are merely shifted version of each other when sampled at exact fractions of a nominal mass interval. Computationally, gains can be had by pre-calculating both $s_0 \text{diag}(w) P^T$ and $[P \text{diag}(w) P^T]$ separately through sparse matrix operation. The pre-calculation of the latter term should result in another sparse symmetrical matrix of dimension 1,000 by 1,000 but with diagonal band-width of ~120 (nonzero elements in each row) and half band-width of ~60 (considering the symmetry) in the above example.

In the absence of baseline components with identical and symmetrical peak shape functions across the whole mass range, the above operation will lead to a sparse matrix $[P \text{diag}(w) P^T]$ which will have a block cyclic structure amenable for a computationally efficient inversion into $[P \text{diag}(w) P^T]^{-1}$ through block cyclic reduction. Block cyclic reduction is described by Gene Golub et al, in *Matrix Computations*, 1989, Johns Hopkins University Press, p. 173, and by William Press et al, in *Numerical Recipes in C*, $2^{nd}$ Ed, 1992, Cambridge University Press, p 71, the disclosures of both of which are incorporated by reference herein.

Even in the presence of baseline components with varying and non-symmetrical peak shape functions across the mass range, the sparse matrix $[P \text{diag}(w) P^T]$ will have the following special form (assuming three baseline components from offset, $1^{st}$, to $2^{nd}$ order, for example)

$$\begin{bmatrix} x & x & x & x & x & x & x \\ x & x & x & x & x & x & x \\ x & x & x & x & x & x & x \\ x & x & x & x & x & & \\ x & x & x & x & x & x & \\ x & x & x & & x & x & x \\ x & x & x & & & x & x \end{bmatrix}$$

which can be solved efficiently as a block diagonal system. Block diagonal systems are described by Gene Golub et al, in *Matrix Computations*, 1989, Johns Hopkins University Press, p. 170, the entire disclosure of which is incorporated by reference herein.

When the true mass spectral peaks do not coincide exactly with nominal masses, one has the following linear combination equations (ignoring any baseline components for simplicity here without loss of generality), $$s_0 = \Sigma c_i p_i + e = \Sigma c_i p_i(m_i) + e$$

where peak shape function $p_i$ with center mass $m_i$ can be expanded to $1^{st}$ order through Taylor series as $$p_i(m_i) = p_i(m_{i0} + \Delta m_i) \approx p_i(m_{i0}) + \Delta m_i \frac{d p_i(m_{i0})}{dm}$$

with $p_i(m_i)$ being the peak shape function centered at the true mass location $m_i$, $p_i(m_{i0})$ being the peak shape function centered at the nominal mass location $m_{i0}$ close to $m_i$, $\Delta m_i$ being the difference between the true and nominal mass location (mass defect or deviation from nominal mass due to multiple charges), and $dp_i(m_{i0})/dm$ being the analytically calculated $1^{st}$ derivative of the peak shape function centered at nominal mass $m_{i0}$.

Talking into account of the mass defect, one has the following modified equation $$s_0 = \sum c_i p_i + e$$
$$= \sum c_i p_i(m_{i0}) + \sum (c_i \Delta m_i) \frac{d p_i(m_{i0})}{dm} + e$$
$$= \sum c_i p_i(m_{i0}) + \sum c_{n+i} \frac{d p_i(m_{i0})}{dm} + e$$

where $c_{n+i} = c_i \Delta m_i$ and n is the number of nominal masses under consideration. Written back into matrix form, one has $$s_0 = cP + e \quad \text{(Equation 9)}$$

where both c and P are augmented now by the coefficients in front of the derivative terms and the derivative terms themselves. It is important to note that because the peak shape functions are chosen to be symmetrical (and therefore orthogonal to the peak shape functions themselves), the inclusion of their derivatives has no adverse effects on the condition of the peak component matrix P, leading to the most precise mass determination and the most repeatable peak integration attainable.

The same WMLR described above can be applied to solve Equation 9 and arrive at the integrated peak areas $c_1, c_2, , c_n$. In addition, Equation 8 can be used to calculate a standard deviation for each peak area thus obtained, leading to elegant statistical measures on the quality of these peak areas.

An improved determination of the actual mass locations can be obtained $$m_i = m_{i0} + \Delta m_i = m_{i0} + c_{n+i}/c_i \quad \text{(Equation 10)}$$

where the relative error in $\Delta m_i$ determination is given by $$|s(\Delta m_i)/\Delta m_i| = |s(c_i)/c_i| + |s(c_{n+i})/c_{n+i}|$$

with standard deviations for $c_i$ and $c_{i+n}$ available from Equation 8 directly. In other words, the standard error for shift estimate is $$s(\Delta m_i) = [|s(c_i)/c_i| + |s(c_{n+i})|/|\Delta m_i|$$

which is also the standard error for the actual mass given in Equation 10.

The description of the detection of significant peaks will now be given according to an illustrative embodiment of the present invention. Based on the p area estimation (Equation 7) and its standard deviation calculation (Equation 8) from the last section, t-statistic can be calculated $$t_i = c_i/s(c_i) \text{ for } i=1, 2 \ldots, n$$

which can be combined with the degree of freedom (df) to statistically detect whether the concentration estimate $c_i$ is significantly above zero or not, i.e., the presence or absence of a mass spectral peak. Typically the df is large enough to be considered infinite and a t-statistic of more than 3.0 or other user-selected cutoff values indicates the statistically significant presence of a mass spectral peak. It is noted that a t-statistic cutoff higher than the usual 3.0 value may be needed to account for the fact that individual mass spectral points after the full calibration depicted in FIG. 12 will no longer be statistically independent but become correlated in its noise. Realistic cutoff values can be established through either computer simulation or practical experience.

FIG. 16A is a diagram illustrating a stick spectrum 1010 reflecting the t-statistic as a function of the exact mass locations (Equation 10) for possible mass spectral peaks across the mass range (raw mass spectrum taken from FIG. 5), according to an illustrative embodiment of the present invention. FIGS. 16B and 16C are diagrams illustrating the overlay 1020 of the raw MS spectral segment and its fully calibrated version 1030, according to an illustrative embodiment of the present invention. FIG. 16)D is a diagram illustrating the corresponding t-statistic 1040 and a horizontal cutoff line 1050 with critical t values set at 12, according to an illustrative embodiment of the present invention. The high degree of simultaneous noise filtering/signal averaging and peak shape calibration can be clearly seen in FIG. 16B, which greatly facilitates the peak analysis with highly sensitive results shown in FIG. 16D, where the detection is only limited by the random noise in the data with no artifacts or other sources of systematic errors.

The mass spectral peaks with its t-statistic above the cutoff will then be reported as statistically significant while those below the cutoff will be reported as not significant. Along with the t-statistic, the exact mass locations and the integrated peak areas can also be reported for the identification and quantification of particular molecules having the corresponding ion fragments. While F-statistic could have been more rigorously applied here, it is believed that the marginal t-statistic would be sufficient due to the minimal interactions (small co-variances) between the peak components. Multicollearity and the application of F-statistic are further described by John Neter et al., in *Applied Linear Regression*, $2^{nd}$ Ed., Irwin, 1989, p. 300, the entire disclosure of which is incorporated by reference herein.

The description of the refinement for peak analysis will now be given according to an illustrative embodiment of the present invention. When higher degree of mass accuracy is desired, one may construct an iterative peak analysis process by treating the results obtained above as initial estimates, and update the peak component matrix P using the newly calculated actual mass locations from Equation 10. Since the updated mass locations would not be spaced one nominal mass unit apart from each other, each peak component and its derivative form in P will need to be separately calculated analytically for all peaks of significance (based on the t-test described above). With the new P matrix constructed, new estimates for the c can be calculated, giving another update on the actual mass locations:

$$m_i^{(k)} = m_i^{(k-1)} \Delta m_i^{(k)} = m_i^{(k-1)} + c_{n+i}^{(k)}/c_i^{(k)}$$

where k=1, 2, ... and $m_i^{(0)} = m_{i0}$ (nominal mass locations). This iterative improvement will be completed when the incremental update $n_{n+i}^{(k)}$ becomes comparable to the standard deviation predicted from Equation 8. With such refinement implemented, extremely high mass accuracy can be achieved for strong mass spectral peaks due to the high signal. to noise available for such peaks, for example, 2 ppm mass accuracy for the peak at mass 69 in FIG. 5. The mass accuracy will deteriorate as the peak intensity drops due to the decreased number of ions available for detection. In other words, the mass accuracy will be limited only by the random noise in the data but not by other artifacts or systematic errors, such as the presence of chemical noise, interference from the isotope peaks, irregular peak shapes, or unknown baselines, as these artifacts would have been fully compensated for by the calibration and peak analysis approaches taken here.

A description will now be given of some of the many attendant advantages and features of the present invention. The present invention provides a method for processing mass spectrometry data that is mathematically elegant, statistically sound, and physics-based. Beneficially, the present invention considers the presence of noise and isotope peaks as additional useful information in the overall scheme. The present invention handles noise, isotope distribution, multiple charges, baselines, peak identification, peak positioning, and peak quantitation, all simultaneously in one integrated process. The sent invention combines occasional MS calibration with routine MS data analysis, and can drastically improve mass accuracy for either high- or low-resolution MS systems. On conventional MS systems with unit mass resolution (FWHM=0.5-0.7 amu), mass accuracy of 1-5 ppm level can be achieved. The present invention includes built-in baseline determination, noise filtering signal averaging, and peak integration. The present invention is computationally efficient such that it can be employed for on-the-fly data reduction on GC/MS or LC/MS or other time-dependent MS detection systems. The present invention has output statistics for instrument diagnostics and data quality control. Moreover, the present invention involves all linear operators with predictable behaviors towards noise and other artifacts. The present invention achieves high mass precision for strong peaks and high sensitivity for weak peaks with wide dynamic range coverage. The present invention allows for the standardization of all d (types) of MS instruments and for universal highly accurate library searches. This allows for molecular fin& ting at much reduced cost in complex matrices even w/o the need for separation due to the high mass accuracy achievable.

While above mass spectral calibration and peak analysis have been described for typical mass spectrometry systems having at least unit mass resolution, it is further appreciated that even for low resolution mass spectrometry systems that do not differentiate peaks located within unit masses or 1/z mass difference, the above mass spectral calibration brings significant and intrinsic advantages. In low resolution mass spectrometry systems, no explicit peak identification is feasible due to the lack of spectral resolution. Instead of the conventional peak analysis including peak identification and quantification, the complete mass spectral trace is used as input to multivariate statistical analysis for either analyte quantification through multivariate calibration or sample classification through cluster analysis or pattern recognition. These multivariate statistical approaches include Principal Component Analysis (PCA) or Principal Component Regression (PCR), as described by Bruce Kowalski et al, in *J.*

*Chemometrics,* 1991, 5, 129, the entire disclosure of which is incorporated by reference herein. One key factor for the successful application of these multivariate statistical approaches is the high mass accuracy and consistent peak shape functions between samples and instruments, as described by Yongdong Wang et al, in *Anal. Chem.,* 1991, 63, 2750, the entire disclosure of which is incorporated by reference herein. The complete mass spectral calibration introduced by this invention should properly align both the mass axes and mass spectral peak shape functions between different samples or instruments to allow for highly accurate multivariate spectral comparison for the purpose of either analyte quantification or sample classification (as used in biomarker discovery).

Figure 17:
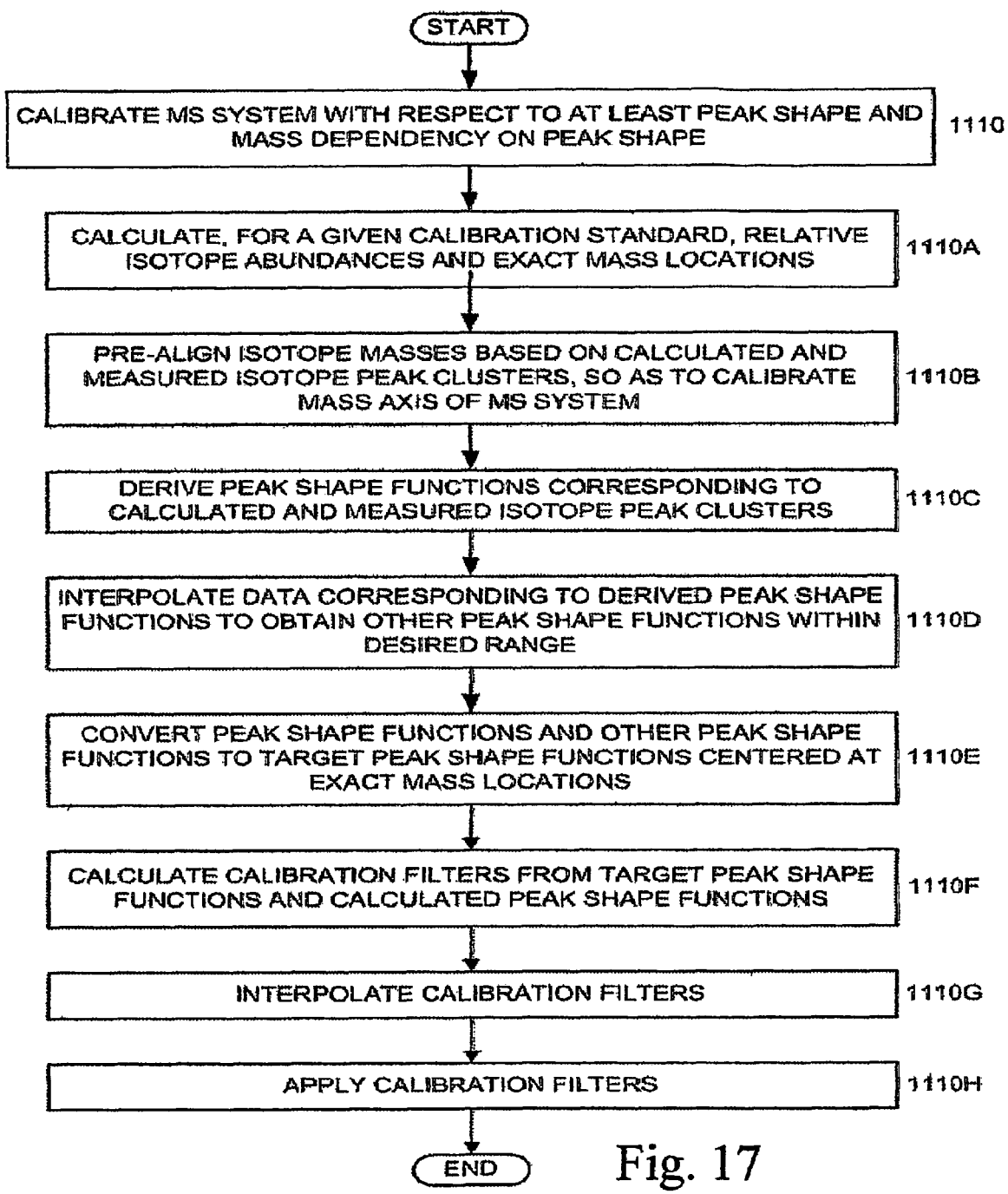
FIG. 17 is a diagram illustrating a method for operating a Mass Spectrometry (MS) instrument system, according to an illustrative embodiment of the present invention.

FIG. 17 is a diagram illustrating a method for operating a Mass Spectrometry (MS) instrument system, according to an illustrative embodiment of the present invention. The MS instrument tem is calibrated with respect to at least peak shape and mass axis (step 1110). It is to be appreciated that step 1110 can be broken down into steps 110A-110G below.

It is to be further appreciated that steps 1110E-1110H are optional. If steps 1110E-1110H are performed, then the method of FIG. 19 may be performed subsequent to the method of FIG. 17. However, if steps 1110E-1110H are omitted, then the method of FIG. 20 may be performed subsequent to the method of FIG. 17.

At step 1110A, relative abundances and exact mass locations of the isotopes are calculated for a given calibration standard.

At step 1110B, isotope masses are aligned based on calculated isotope peak clusters and measured isotope peak clusters corresponding to the calibration standard, so as to calibrate a mass axis of the MS instrument system.

At step 1110C, peak shape functions are derived corresponding to the calculated and measured isotope peak clusters.

At step 1110D, data corresponding to the derived peak shape functions is interpolated to obtain other peak shape functions within desired mass ranges. Each of the derived peak shape functions and the other peak shape functions correspond to the actually measured mass locations.

At step 1110E, the peak shape functions and the other peak shape functions are converted to target peak shape functions centered at exactly the mid-point in the desired mass ranges.

At step 1110F, calibration filters are calculated from the target peak shape fictions and the calculated peak shape functions.

At step 1110G, the calibration filters are interpolated onto a finer grid.

At step 1110K the calibration filters are applied so as to calibrate the MS instrument system.

Figure 18:
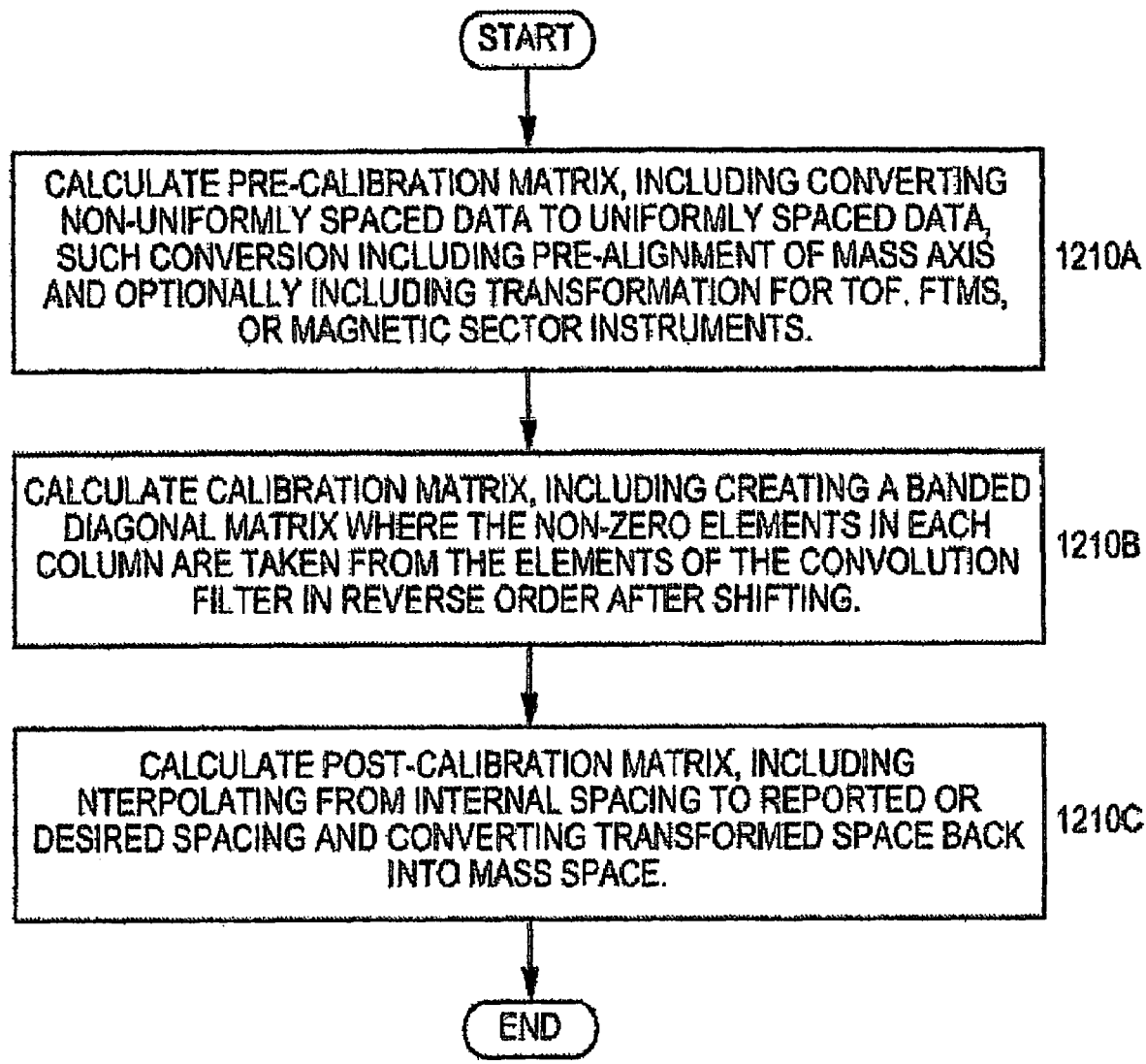
FIG. 18 is a diagram further illustrating step 1110H of the method of FIG. 17, according to an illustrative embodiment of the present invention.

FIG. 18 is a diagram further illustrating step 1110H of the method of FIG. 17, according to an illustrative embodiment of the present invention. Step 1110H includes steps 1210A-1210C below.

At step 1210A, a pre-calibration matrix is calculated. Calculation of the pre calibration matrix includes converting non-uniformly spaced data to uniformly spaced data, such conversion including pre-alignment of mass axis and optionally including transformation for TOF, FIMS, or other instruments.

At step 1210B, a calibration matrix is calculated. The calculation of the calibration matrix includes creating a banded diagonal matrix where the non-zero elements in each column are taken from the elements of the convolution filter in reverse order after shifting.

At step 1210C, a post-calibration matrix is calculated The calculation of the post-calibration matrix includes interpolating from internal spacing to output or desired spacing and converting transformed space back into original mass space.

Figure 19:
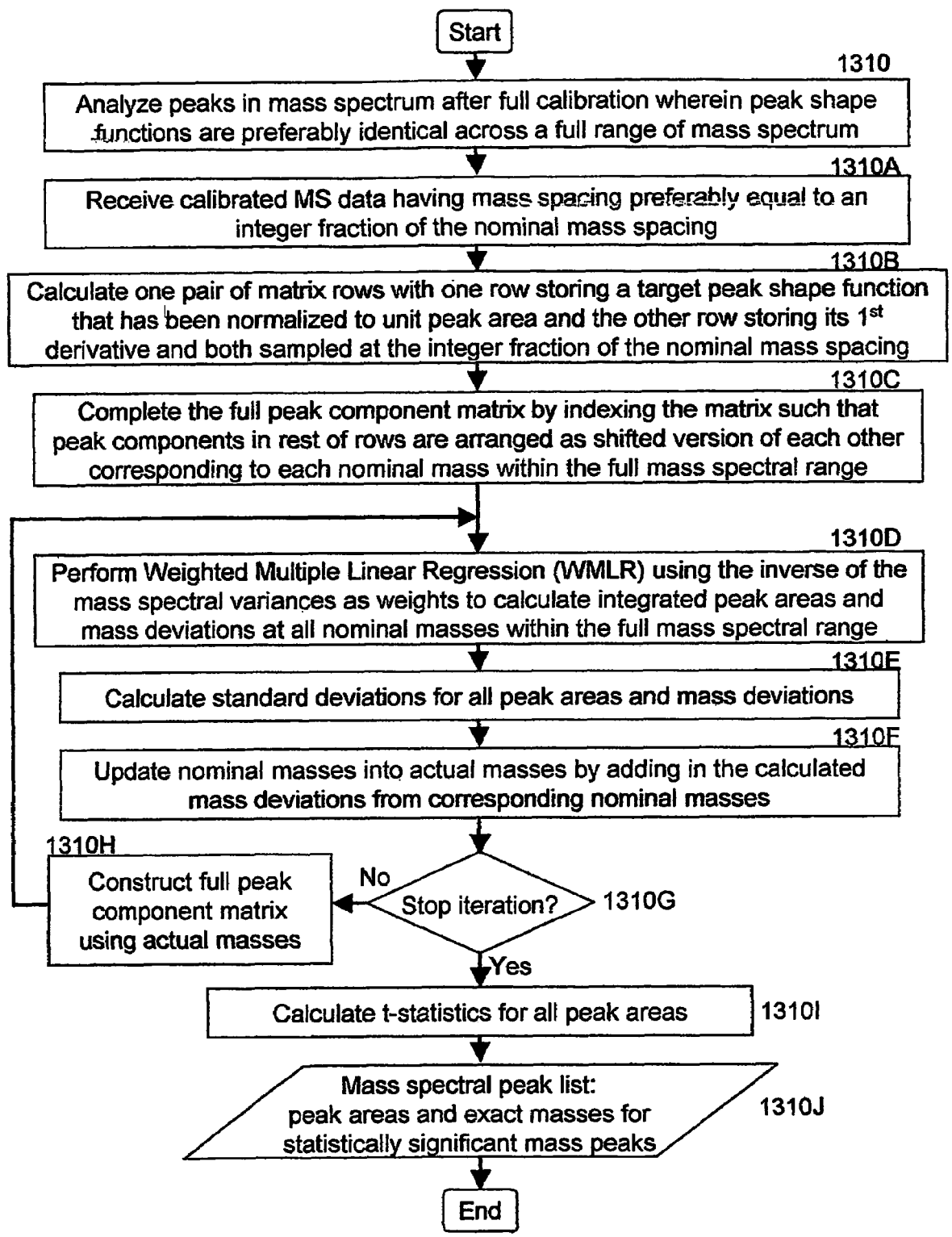
FIG. 19 is a diagram illustrating a method for analyzing a Mass Spectrometry (MS) spectrum obtained from an MS instrument system after the full mass spectral calibration, according to an illustrative embodiment of the present invention.

FIG. 19 is a diagram illustrating a method for analyzing a Mass Spectrometry (MS) spectrum obtained from an MS instrument system, according to an illustrative embodiment of the present invention.

Peaks in the MS spectrum are analyzed after full calibration (step 1310). It is preferable, but not necessary, that the peak shape functions are identical across a full range of mass spectrum.

Calibrated MS data having a mass spacing preferably equal to an integer fraction (e.g., $1/4$, $1/5$, $1/8$, $1/10$, $1/12$, $1/16$) of the nominal mass spacing (e.g., 1 amu or $1/z$) is received (step 1310A).

One pair of matrix rows of a fill peak component matrix is calculated, such that one row of the par stores a target peak shape function that has been normalized to unit peak area and the other row of the pair stores the first derivative of the tart peak shape function stored in the one row of the pair, and such that both the target peak shape function and its first derivative have been sampled at the integer fraction of the nominal mass spacing (step 1310B).

The full peak component matrix is completed by indexing the matrix such that peak components in the remainder of the rows are arranged as shifted versions of each other corresponding to each nominal mass within the fill mass spectral range (step 1310C).

A Weighted Multiple Linear Regression (WLR) operation is performed using the inverse of the mass spectral variances as weights to calculate integrated peak area and mass deviations at all nominal masses within the full mass spectral range (step 1310D).

Standard deviations are calculated for all peak areas and mass deviations (step 1310E).

Nominal masses are updated into actual masses by adding in the calculated maw deviations from corresponding nominal masses (step 1310F).

The performing (step 1310D), calculating (1310E) and updating (1310F) steps are repeated until any incremental improvements in either the peak areas or the mass deviations are smaller than corresponding standard deviations or other preset criteria (step 1310G). If the incremental improvements m either the peak areas or the mass deviations are not smaller than the corresponding standard deviations or other preset criteria, then the fill peak component matrix is reconstructed using the actual masses (step 1310H), and the method returns to step 1310D. Otherwise, the method proceeds to step 1310I.

t-statistics are calculated for all of the peak areas (step 1310I), to obtain a mass spectral peak list that includes peak area and exact masses for statistically significant mass peaks (step 1310J).

Figure 20:
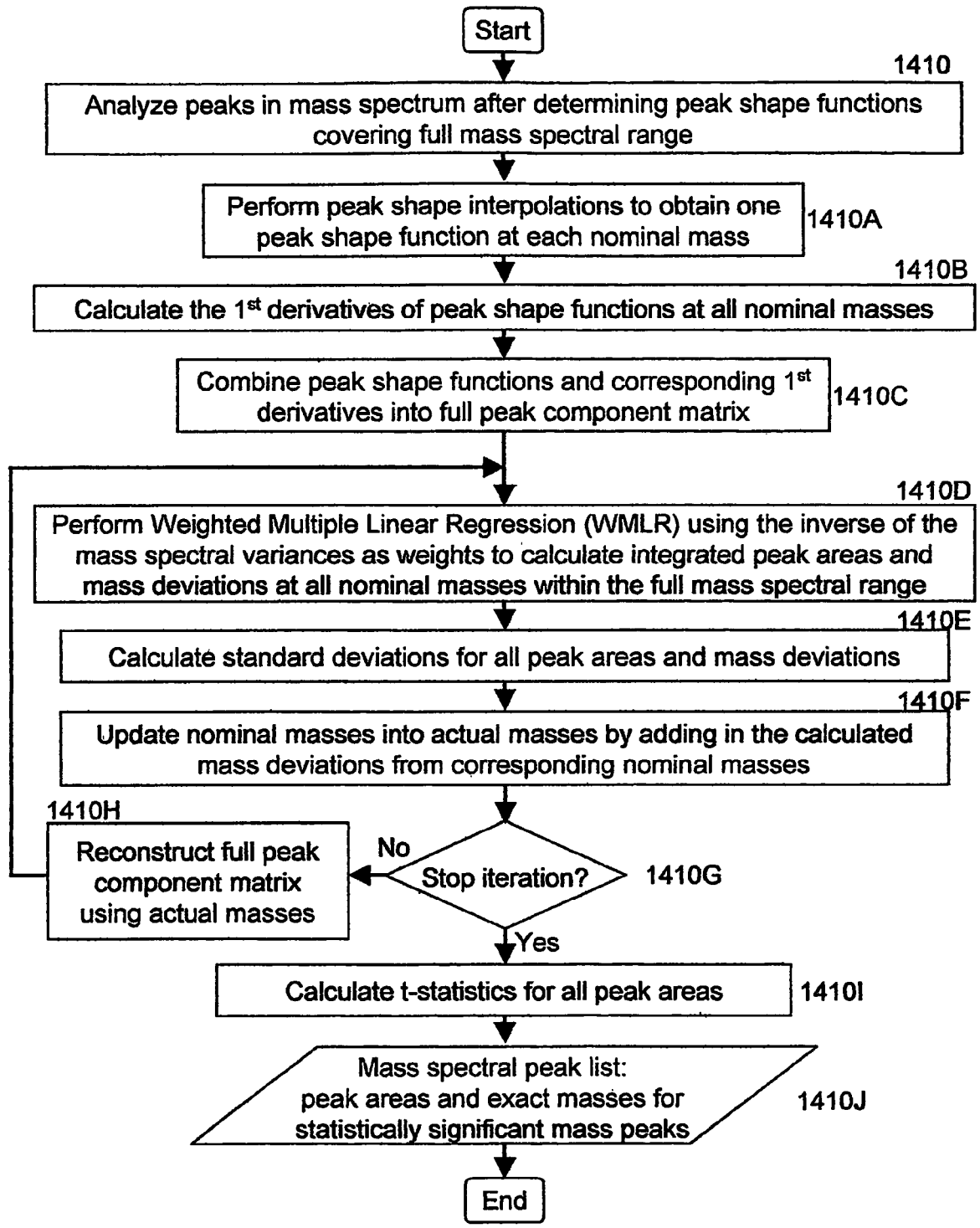
FIG. 20 is a diagram illustrating a method for analyzing a Mass Spectrometry (MS) spectrum obtained from an MS instrument system after determination of peak shape functions, according to an illustrative embodiment of the present invention.

FIG. 20 is a diagram illustrating a method for analyzing a Mass Spectrometry (MS) spectrum, according to an illustrative embodiment of the present invention.

Peaks in the MS spectrum are analyzed after determining peak shape functions covering the full mass spectral range (step 1410). Peak shape interpolations are performed to obtain one peak shape function at each nominal mass (step 1410A).

First derivatives of the peak shape functions are calculated at all nominal masses (step 1410B). Peak shape functions and the corresponding first derivatives are combined into a full peak component matrix (step 1410C).

A Weighted Multiple Linear Regression (WMLR) operation is performed using the inverse of the mass spectral variances as weights to calculate integrated peak area and mass deviations at all nominal masses within the full mass spectral range (step 1410D).

Standard deviations are calculated for all peak areas and mass deviations (step 1410E).

Nominal masses are updated into actual masses by adding in the calculated mass deviations from corresponding nominal masses (step 1410F).

The performing (step 1410D), calculating (1410E) and updating (1410F) steps are repeated until any incremental improvements in either the peak areas or the mass deviations are smaller than corresponding standard deviations or other preset criteria (step 1410G). If the incremental improvements in either the peak areas or the mass deviations are not smaller than the corresponding standard deviations or other preset criteria, then the full peak component matrix is reconstructed using the actual masses (step 1410H), and the method returns to step 1410D. Otherwise, the method proceeds to step 1410I.

t-statistics are calculated for all of the peak areas (step 1310I), to obtain a mass spectral peak list that includes peak area and exact masses for statistically significant mass peaks (step 1410J).

Figure 21:
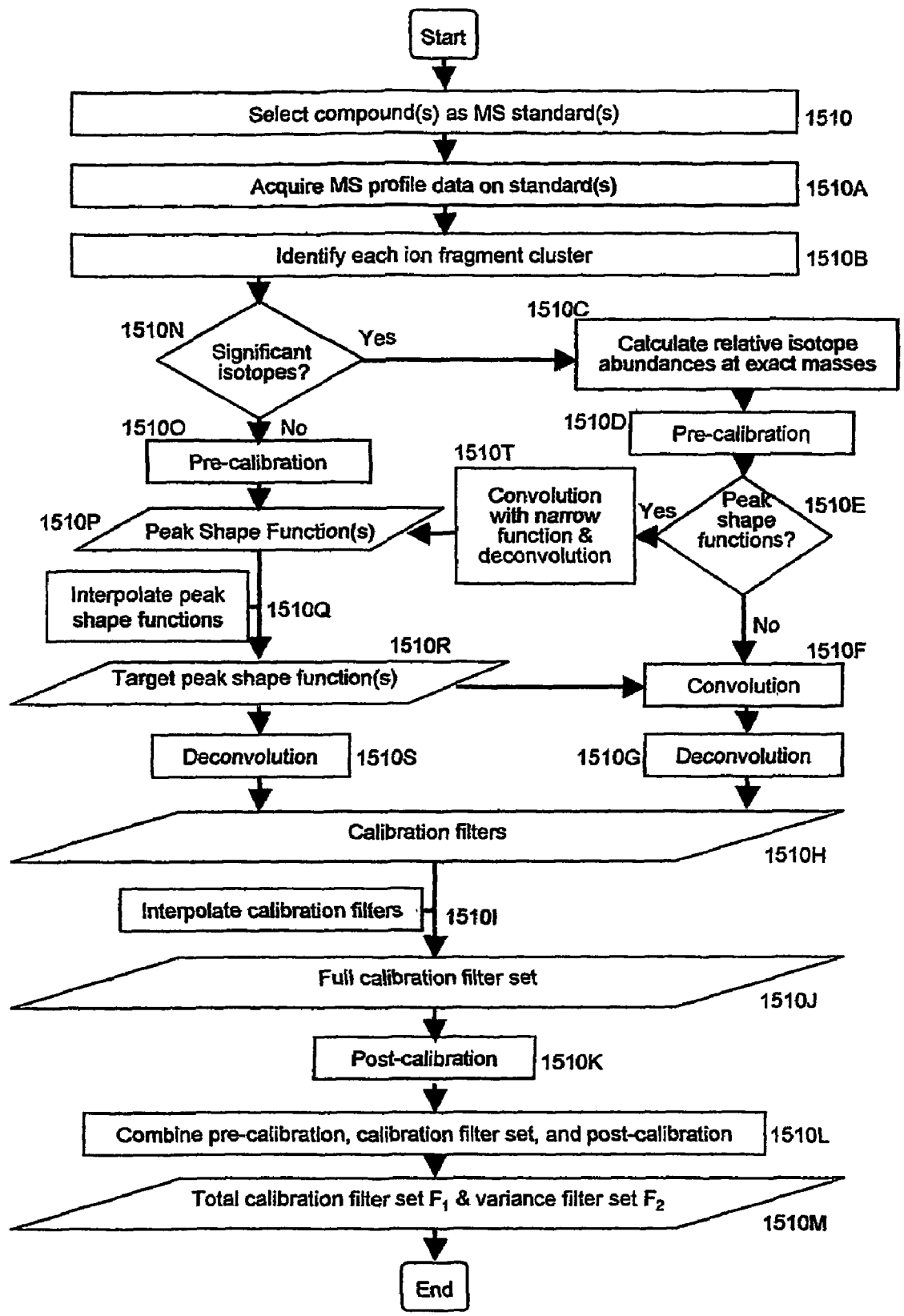
FIG. 21 is a diagram flier illustrating the method of FIG. 17 including optional steps for calibrating Mass Spectrometry (MS) system, according to an illustrative embodiment of the present invention.

FIG. 21 is a flow diagram illustrating a method for creating calibration filters for a Mass Spectrometry (MS) instrument system, according to an illustrative embodiment of the present invention.

One or more compounds are selected as a Mass Spectrometry (MS) standard (1510). MS profile data is acquired on the MS standard(s) (step 1510A). Each ion fragment cluster is identified (step 1510B).

Following step 1510B, it is determined whether significant isotopes exist (step 1510N). If so, relative isotope abundances are calculated at exact masses (step 1510C). A pre-calibration step is performed (step 1510D). The pre-calibration step may involve performing pre-calibration instrument-dependent transformations on raw data, performing a pre-calibration mass spacing adjustment, and/or pre-aligning mass spectral isotope peaks.

It is then determined whether obtaining peak shape functions is desired (step 1510E). If so, convolution operations are performed on both the calculated relative isotope abundances and the measured isotope peak clusters using the same continuous function with a narrow peak width, and then a deconvolution operation is performed between the measured isotope peak clusters and the resulted isotope peak clusters after the convolution operations (step 1510T) to obtain at least one peak shape function (1510P), and the method proceeds to step 1510Q. Otherwise, convolution operations are performed between the calculated relative isotope abundances and the target peak shape functions (step 1510F) and a deconvolution operation is performed between the measured isotope peak clusters and the resulted isotope peak cluster after the convolution operations (step 1510G) to obtain at least one calibration filter (1510H).

Also following step 1510B, it is determined whether significant isotopes exist (step 1510N). If not, a pre-calibration step is performed (1510O). The pre-calibration step may involve performing pre-calibration instrument-dependent transformations on raw data, performing a pre-calibration mass spacing adjustment, and/or pre-aligning mass spectral isotope peaks.

The peak shape functions thus obtained (1510P) are interpolated (step 1510Q) before deconvolution operation (1510S) with specified target peak shape functions (step 1510R).

At step 1510S, a deconvolution operation is performed between mass spectral target peak shape functions and one of measured mass spectral peak shape functions and the calculated mass spectral peak shape functions to convert the mass spectral peak shape functions and the at least one other mass spectral peak shape function to the mass spectral target peak shape functions centered at mid-points within respective mass ranges covered by the mass spectral peak shape functions and the at least one other mass spectral peak shape function. At least one calibration filter is calculated from the mass spectral peak shape functions centered at the mid-points within the respective mass ranges covered by the mass spectral peak shape functions and the at least one other mass spectral peak shape function (step 1510H).

An interpolation operation is performed between two calibration filters to obtain at least one other calibration filter within a desired mass range (step 1510I).

A full calibration filter set (step 1510J) is obtained from the calibration filters of step 1510H and any resulting from the interpolation of step 1510I. A post-calibration step is performed (step 1510K). The post calibration step may involve performing post-calibration instrument-dependent transformations and/or performing a post-calibration mass spacing adjustment.

Data are combined corresponding to the pre-calibration step 1510O, the fill calibration filter of step 1510J, and the post-calibration step 1510K (step 1510L) to obtain a total calibration filter set F, and a variance filter set $F_2$ (step 1510M).

Figure 22:
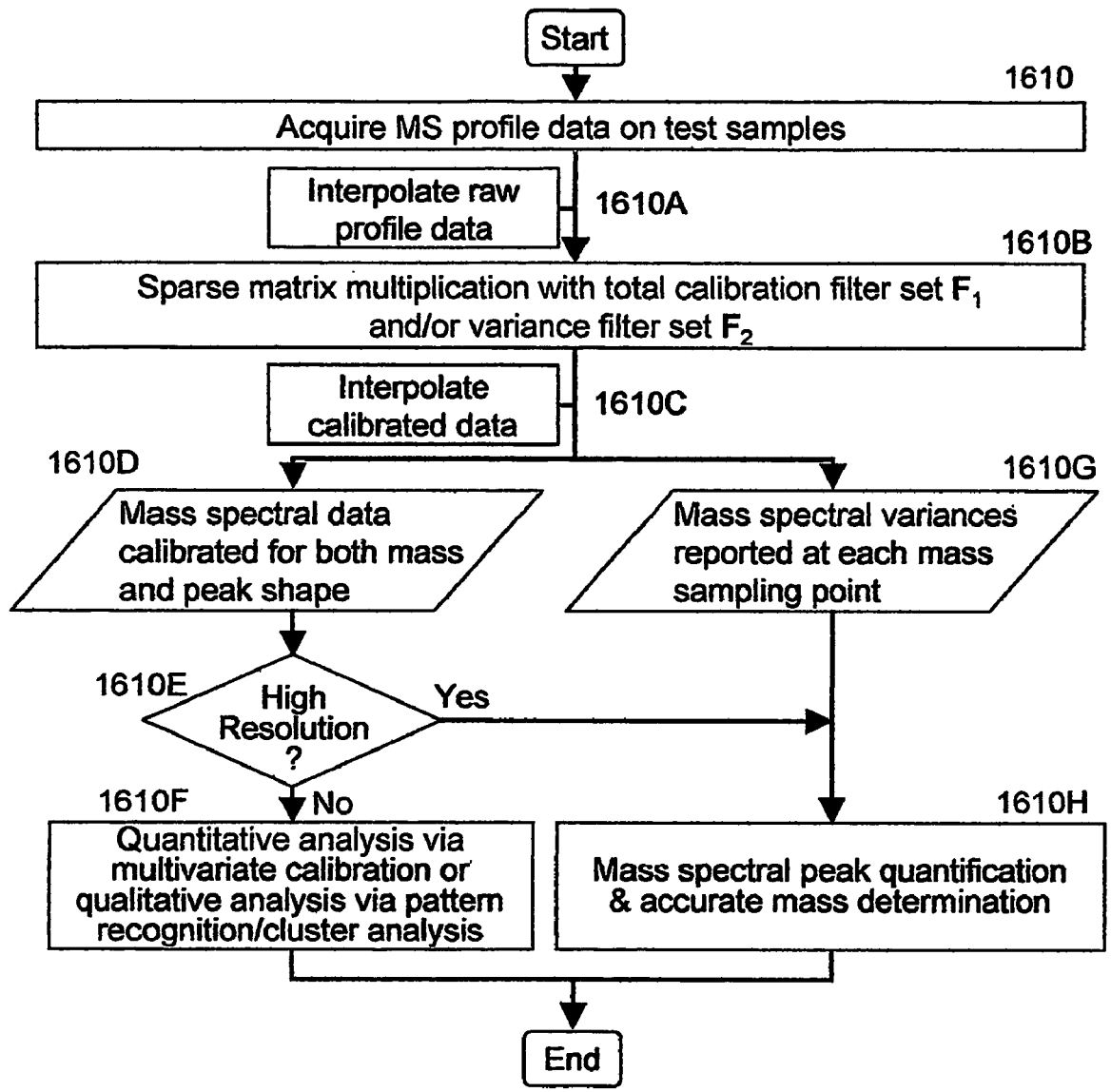
FIG. 22 is a diagram illustrating a method for processing a Mass Spectrometry (MS) spectrum obtained from an MS instrument system, according to an illustrative embodiment of the present invention.

FIG. 22 is a block diagram illustrating a method for processing Mass Spectrometry (MS) data, according to an illustrative embodiment of the present invention MS profile data is acquired on test samples (step 1610). The profile data is interpolated if necessary (step 1610A). Sparse matrix multiplication is performed with the total calibration filter set $F_1$ and/or the variance filter set $F_2$ (step 1610B). Calibrated data is then interpolated into reported mass spacing if necessary (step 1610C).

The mass spectral variances are reported at each mass sampling point (step 1610G), and the method proceeds to step 1610H. Also following step 1610C, the mass spectral data is calibrated for both mass and peak shape (step 1610D), and the method proceeds to step 1610E.

At step 1610E, it is determined whether the MS instrument so used is of a high enough resolution to allow for mass spectral peak identification. If so, then the method proceeds to step 1610H for mass spectral peak identification. Otherwise, the method proceeds to step 1610F for direct comparison of full mass spectral data without explicit peak identification.

At step 1610H, a mass spectral peak quantification and accurate mass determination step is performed. At step 1610F, a quantitative analysis is performed via multivariate calibration or a qualitative analysis is performed via pattern recognition/cluster analysis using the full mass spectral response curve as inputs without explicit mass spectral peak identification.

The principals of the invention may also be applied to situations in which very complex mixtures of proteins, such as those in living tissue or blood, are being analyzed. Id those cases the compounds being analyzed, for purposes of research or diagnosis, are not necessarily pure. Even if pure compounds are present, the chemical formula or identity may not be known. Further, in these very complex samples, with very complex spectra, it may be disadvantageous to add standard calibration compounds, thus making a complex situation even more difficult to interpret. Finally, there are cases in which a mistake may be made in that a standard calibration compound was left out before doing a sample run. It may be difficult or impossible to replace the sample to repeat the run.

Nevertheless, it is possible to take advantage of the principles of the present invention by performing a relative calibration. Complex biological samples often contain some compounds that provide a common background. For example, blood generally contains hemoglobin and BSA (bovine Serum Albumin). In accordance with the general principles of the invention, specific peaks that are measured in a test sample of the same general nature as those being analyzed, may be selected as a "gold standard." The selected peaks in the gold standard are then treated as targets in the samples being analyzed. These selected peaks may optionally be convoluted with a known function, such as a Gaussian, of a width insignificant compared to the original peak, to form the targets. All of the transformations, filtering, convolutions and deconvolutions discussed in detail above may be performed. A convolution filter is derived to operate on the peaks of the sample being analyzed (treated as if they were calculated peak shape functions) so that they may be compared to the peaks of the gold standard. This may be done with just one peak as gold standard with convolution filter replicated or extended so as to cover all peak positions within the range. If more than one peak of the gold standard is selected, then interpolation between peaks may be performed for positions between the peaks. These procedures are advantageously followed for each sample being analyzed.

Once these steps have been followed, the resulting data may be subject to various forms of differential analysis. Pattern recognition, discriminant analysis, cluster analysis. principal component analysis, partial least squares analysis, and various multivariate regression analysis may be used. While absolute accuracy may not be assured, the results may be extremely useful for prescreening, screening, or medical diagnostics. This may be especially valuable for purposes of medical research or diagnosis, especially where the diagnosis may be independently confirmed by other, perhaps more invasive techniques.

Although the illustrative embodiments have been described herein with reference to the accompanying drawings, it is to be understood that the present invention is not limited to those precise embodiments, and that various other changes and modifications may be affected therein by one of ordinary skill in the related art without departing from the scope or spirit of the invention. All such changes and modifications are intended to be included within the scope of the invention as defined by the appended claims.

What is claimed is:

1. A method for obtaining at least one calibration filter for a Mass Spectrometry (MS) instrument system, comprising the steps of:
   obtaining, for a given calibration ion with its isotopes, measured isotope peak cluster data in a mass spectral range;
   calculating, for the given calibration ion with its isotopes, relative isotope abundances and actual mass locations of isotopes corresponding thereto;
   specifying mass spectral target peak shape functions;
   performing convolution operations between the calculated relative isotope abundances and the mass spectral target peak shape functions to form calculated isotope peak cluster data; and
   performing a deconvolution operation between the measured isotope peak cluster data and the calculated isotope peak cluster data after the convolution operations to obtain the at least one calibration filter.

2. The method of claim 1, wherein any of said steps of performing convolution operations and performing a deconvolution operation employs at least one of a Fourier Transform, a matrix multiplication, and a matrix inversion.

3. The method of claim 1, further comprising the step of pre-aligning measured mass spectral isotope peaks based on a least squares fit between centroid masses of the calculated relative isotope abundances and those of the measured isotope peak clusters, in a pre-calibration step performed subsequent to said calculating step.

4. The method of claim 1, further comprising the steps of:
   performing pre-calibration instrument-dependent transformations on raw mass spectral data; and
   performing post-calibration instrument-dependent transformations on a calculated data set corresponding to a test sample.

5. The method of claim 4, wherein said steps of performing pre-calibration instrument-dependent transformations and performing post-calibration instrument-dependent transformations involve respectively creating a pre-calibration banded diagonal matrix and a post-calibration banded diagonal matrix, each nonzero element along a banded diagonal of each of the respective matrices for respectively performing an interpolation function corresponding to the pre-calibration instrument-dependent transformations and the post-calibration instrument-dependent transformations, and said method further comprises the step of creating from the at least one calibration filter a calibration banded diagonal matrix for performing both peak shape and mass axis calibration.

6. The method of claim 5, further comprising the step of multiplying the pre-calibration banded diagonal matrix, the calibration banded diagonal matrix and the post-calibration banded diagonal matrix into a total filtering matrix prior to calibrating a test sample.

7. The method of claim 6, wherein the peak shape and the mass axis calibration are performed by matrix multiplication between the total filtering matrix and the raw mass spectral data, and said method further comprises the step of creating another banded diagonal matrix to estimate mass spectral variances of a calibrated signal, the other banded diagonal matrix having each nonzero element along a banded diagonal equal to a square of a corresponding element in the total filtering matrix.

8. The method of claim 7, further comprising the step of applying a weighted regression operation to calibrated mass spectral data to obtain at least one of integrated peak areas, actual masses and other mass spectral peak data for the mass spectral peaks.

9. The method of claim 8, wherein weights of the weighted regression operation are proportional to an inverse of the mass spectral variances.

10. The method of claim 7, further comprising the step of applying multivariate statistical analysis to calibrated mass spectral data to at least one of quantify, identify, and classify test samples.

11. The method of claim 1, further comprising the steps of:
    performing a pre-calibration mass spacing adjustment from a non-uniformly spaced mass acquisition interval to a uniformly spaced mass interval; and
    performing a post-calibration mass spacing adjustment from the uniformly spaced mass interval to a reporting interval.

12. The method of claim 11, wherein said steps of performing the pre-calibration mass spacing adjustment and the post-calibration mass spacing adjustment involve respectively creating a pre-calibration banded diagonal matrix and a post-calibration banded diagonal matrix, each nonzero element along a banded diagonal of each of the respective matrices for respectively performing an interpolation function corresponding to the pre-calibration mass spacing adjustment and the post-calibration mass spacing adjustment, and said method further comprises the step of creating from the at least one calibration filter a calibration banded diagonal matrix for performing both peak shape and mass axis calibration.

13. The method of claim 12, further comprising the step of multiplying the pre-calibration banded diagonal matrix, the calibration banded diagonal matrix and the post-calibration banded diagonal matrix into a total filtering matrix prior to calibrating a test sample.

14. The method of claim 13, wherein the peak shape and the mass axis calibration are performed by matrix multiplication between the total filtering matrix and raw mass spectral data, and said method further comprises the step of creating another banded diagonal matrix to estimate mass spectral variances of a calibrated signal, the other banded diagonal matrix having each nonzero element along a banded diagonal equal to a square of a corresponding element in the total filtering matrix.

15. The method of claim 14, further comprising the step of applying a weighted regression operation to calibrated mass spectral data to obtain at least one of integrated peak areas, actual masses and other mass spectral peak data for the mass spectral peaks.

16. The method of claim 15, wherein weights of the weighted regression operation are proportional to an inverse of the mass spectral variances.

17. The method of claim 14, further comprising the step of applying multivariate statistical analysis to calibrated mass spectral data to at least one of quantify, identify, and classify test samples.

18. The method of claim 1, wherein the at least one calibration filter comprises at least two calibration filters, and said method further comprises the step of further interpolating between the at least two calibration filters to obtain at least one other calibration filter within a desired mass range.

19. The method of claim 18, wherein said interpolating step comprises the steps of:
collecting the at least two calibration filters as vectors in a matrix for decomposition;
decomposing the matrix that includes the at least two calibration filters;
interpolating between decomposed vectors of the matrix to obtain interpolated vectors; and
reconstructing the at least one other calibration filter using the interpolated vectors.

20. The method of claim 19, wherein said decomposing step is performed using at least one of Singular Value Decomposition (SVD) and wavelet decomposition.

21. The method of claim 1, further comprising the step of introducing the calibration standard one of prior to and in real-time through at least one of continuous infusion and online mixing so as to acquire both calibration data and test data in a single experiment.

22. For use in a mass spectrometer having associated therewith a computer for performing data analysis functions of data produced by the mass spectrometer, a computer readable medium having placed thereon computer readable program instructions for performing the method of claim 1.

23. The method of claim 1, wherein said calibration filter, when applied to a mass spectrum, performs at least one of noise filtering, signal averaging, mass calibration, and peak shape adjustment.

24. The method of claim 1, wherein said calibration filter is a digital filter.

25. A method of processing raw mass spectral data, comprising the steps of:
applying a total filtering matrix to the raw mass spectral data to obtain calibrated mass spectral data,
wherein the total filtering matrix is formed by:
measured isotope peak cluster data, obtained for a given calibration ion in a mass spectral range,
relative isotope abundances and actual mass locations of isotopes corresponding thereto, calculated for a same calibration ion,
specified mass spectral target peak shape functions,
convolution operations performed between the calculated relative isotope abundances and the mass spectral target peak shape functions to form calculated isotope peak cluster data; and
a deconvolution operation performed between the measured isotope peak cluster data and calculated isotope peak cluster data after the convolution operations to obtain at least one calibration filter for the total filtering matrix.

26. The method of claim 25, wherein said applying step further comprises the step of interpolating the raw mass spectral data onto a same mass axis as that required by the total filtering matrix.

27. The method of claim 25, wherein said applying step further comprises the step of interpolating the calibrated mass spectral data onto any desired mass axis different from that given by the total filtering matrix.

28. The method of claim 25, further comprising the step of applying a weighted regression operation to the calibrated mass spectral data to obtain at least one of integrated peak areas, actual masses and other mass spectral peak data for the mass spectral peaks.

29. The method of claim 28, wherein weights of the weighted regression operation are proportional to an inverse of mass spectral variances.

30. The method of claim 25, further comprising the step of applying multivariate statistical analysis to the calibrated mass spectral data to at least one of quantify, identify, and classify test samples.

31. A mass spectrometer having associated therewith a computer for performing data analysis functions of data produced by the mass spectrometer, the computer performing the method of any one of claims 1-30.

32. For use in a mass spectrometer having associated therewith a computer for performing data analysis functions of data produced by the mass spectrometer, a computer readable medium having placed thereon computer readable program instructions for performing the method of claim 25.

33. A mass spectrometer having associated therewith a computer for performing data analysis functions of data produced by the mass spectrometer, the computer performing the method of claim 25, 34. The method of claim 25, wherein said calibration filter is a linear filter and its application to raw mass spectral data involves one of convolution, matrix multiplication, or point-by-point multiplication through Fourier transformation.

* * * * *